United States Patent
Yuan et al.

(10) Patent No.: US 12,278,789 B2
(45) Date of Patent: Apr. 15, 2025

(54) INDICATING BUNDLING ACROSS CARRIERS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/793,464

(22) PCT Filed: Jan. 23, 2020

(86) PCT No.: PCT/CN2020/073974
§ 371 (c)(1),
(2) Date: Jul. 18, 2022

(87) PCT Pub. No.: WO2021/147073
PCT Pub. Date: Jul. 29, 2021

(65) Prior Publication Data
US 2023/0069352 A1    Mar. 2, 2023

(51) Int. Cl.
*H04L 5/00* (2006.01)
*H04L 1/1812* (2023.01)
(Continued)

(52) U.S. Cl.
CPC .......... *H04L 5/0094* (2013.01); *H04L 1/1819* (2013.01); *H04L 5/0032* (2013.01); *H04L 5/0048* (2013.01); *H04W 72/23* (2023.01)

(58) Field of Classification Search
None
See application file for complete search history.

(56) References Cited

U.S. PATENT DOCUMENTS

| 10,880,067 B2 | 12/2020 | Patel et al. |
| 2014/0314007 A1* | 10/2014 | Chen .................. H04B 7/0619 370/329 |

(Continued)

FOREIGN PATENT DOCUMENTS

| CN | 101873644 A | 10/2010 |
| CN | 101998649 A | 3/2011 |

(Continued)

OTHER PUBLICATIONS

NEC Group: "Pdcch Structure for LTE-Advanced System", 3GPP TSG RAN WG1 Meeting #94bis, R1-091692, 3rd Generation Partnership Project, Mobile Competence Centre, 650, Route Des Lucioles, F-06921 Sophia-Antipolis Cedex, France, No. San Francisco, USA, Apr. 28, 2009, Apr. 28, 2009, XP050339231, 9 pages.

(Continued)

*Primary Examiner* — Eunsook Choi
(74) *Attorney, Agent, or Firm* — Arun Swain

(57) ABSTRACT

Various aspects relate to indicating bundling across carriers (e.g., across cells). In some aspects, bundling may involve sending information sent over multiple carriers (e.g., information sent from or to multiple cells) where the information sent over the carriers is combinable at a receiver. For example, a communication device may send the same set of information (e.g., transport blocks with the same content) via multiple carriers, send different redundancy versions of a set of information via different carriers, send information via different beams on different carriers, or send information using a combination of these techniques. The disclosure relates in some aspects to indicating whether bundling is applied across carriers. For example, downlink control information (DCI) that schedules transmissions on multiple carriers (e.g., multiple component carriers) may include an (Continued)

indication of whether bundling is applied across all or a subset of the scheduled carriers.

34 Claims, 13 Drawing Sheets

(51) Int. Cl.
*H04W 72/23* (2023.01)
*H04L 1/18* (2023.01)

(56) References Cited

U.S. PATENT DOCUMENTS

| | | | | |
|---|---|---|---|---|
| 2019/0075014 | A1* | 3/2019 | Zhou | H04W 74/0833 |
| 2019/0190582 | A1* | 6/2019 | Guo | H04B 17/17 |
| 2019/0230529 | A1* | 7/2019 | Sadiq | H04B 7/0695 |
| 2019/0239093 | A1* | 8/2019 | Zhang | H04L 5/001 |
| 2019/0319752 | A1* | 10/2019 | Tang | H04W 72/23 |
| 2019/0356524 | A1* | 11/2019 | Yi | H04W 48/16 |
| 2019/0357224 | A1* | 11/2019 | Li | H04L 5/0055 |
| 2019/0357238 | A1 | 11/2019 | Zhou et al. | |
| 2021/0105748 | A1* | 4/2021 | Chen | H04L 1/1812 |
| 2021/0185648 | A1* | 6/2021 | Bai | H04L 5/0094 |

FOREIGN PATENT DOCUMENTS

| | | |
|---|---|---|
| CN | 106937328 A | 7/2017 |
| WO | 2013117011 A1 | 8/2013 |
| WO | 2018209285 | 11/2018 |

OTHER PUBLICATIONS

Supplementary European Search Report—EP20916144—Search Authority—The Hague—Sep. 5, 2023.
ZTE: "Enhancements on Multi-TRP/Panel Transmission", 3GPP TSG RAN WG1 Meeting #94bis, R1-1810220, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, XP051517636, sections 1, 2.1, 2.2.1, 2.2.3, 9 pages.
International Search Report and Written Opinion—PCT/CN2020/073974—ISAEPO—Oct. 26, 2020.
Motorola, "Common PDCCH Design for Carrier Aggregation", 3GPP TSG-RAN1 #56bis, R1-091327, Mar. 27, 2009, 2 pages.

* cited by examiner

INDICATING BUNDLING ACROSS CARRIERS

CROSS-REFERENCE TO RELATED APPLICATION(S)

This application is the U.S. national stage of PCT patent application number PCT/CN2020/073974 filed on Jan. 23, 2020.

INTRODUCTION

The technology discussed below generally relates to wireless communication and, more particularly but not exclusively, to indicating bundling that is applied across carriers.

Next-generation wireless communication systems (e.g., 5GS) may include a 5G core network and a 5G radio access network (RAN), such as a New Radio (NR)-RAN. The NR-RAN supports communication via one or more carriers. For example a user equipment (UE) may communicate with a cell via a carrier and/or communicate with multiple cells via multiple carriers (e.g., component carriers).

As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

SUMMARY

The following presents a summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure as a prelude to the more detailed description that is presented later.

In one aspect, the disclosure provides a wireless communication device configured for communication that includes a processor, a transceiver, and a memory that are communicatively coupled to one another. The processor and the memory are configured to receive, via the transceiver, downlink control information (DCI). The DCI includes a first indication that first information scheduled for transmission on a first carrier of a plurality of carriers is a duplication of or combinable with second information scheduled for transmission on a second carrier of the plurality of carriers. The processor and the memory are further configured to receive the first information via the first carrier, receive the second information via the second carrier, and combine the first information and the second information according to the first indication.

In one aspect, the disclosure provides a method of communication for a wireless communication device. The method includes receiving downlink control information (DCI). The DCI includes a first indication that first information scheduled for transmission on a first carrier of a plurality of carriers is a duplication of or combinable with second information scheduled for transmission on a second carrier of the plurality of carriers. The method also includes receiving the first information via the first carrier, receiving the second information via the second carrier, and combining the first information and the second information according to the first indication.

In one aspect, the disclosure provides a wireless communication device. The device includes means for receiving downlink control information (DCI). The DCI includes a first indication that first information scheduled for transmission on a first carrier of a plurality of carriers is a duplication of or combinable with second information scheduled for transmission on a second carrier of the plurality of carriers. The device also includes means for receiving the first information via the first carrier, means for receiving the second information via the second carrier, and means for combining the first information and the second information according to the first indication.

In one aspect, the disclosure provides an article of manufacture for use by a wireless communication device in a wireless communication network. The article includes a computer-readable medium having stored therein instructions executable by one or more processors of the wireless communication device to receive downlink control information (DCI). The DCI includes a first indication that first information scheduled for transmission on a first carrier of a plurality of carriers is a duplication of or combinable with second information scheduled for transmission on a second carrier of the plurality of carriers. The computer-readable medium also has stored therein instructions executable by one or more processors of the wireless communication device to receive the first information via the first carrier, receive the second information via the second carrier, and combine the first information and the second information according to the first indication.

In one aspect, the disclosure provides a base station configured for communication that includes a processor, a transceiver, and a memory that are communicatively coupled to one another. The processor and the memory are configured to generate downlink control information (DCI). The DCI comprises a first indication that first information scheduled for transmission on a first carrier of a plurality of carriers is a duplication of or combinable with second information scheduled for transmission on a second carrier of the plurality of carriers. The processor and the memory are also configured to send the DCI to at least one wireless communication device via the transceiver.

In one aspect, the disclosure provides a method of communication for a base station. The method includes generating downlink control information (DCI). The DCI includes a first indication that first information scheduled for transmission on a first carrier of a plurality of carriers is a duplication of or combinable with second information scheduled for transmission on a second carrier of the plurality of carriers. The method also includes sending the DCI to at least one wireless communication device.

In one aspect, the disclosure provides a base station. The base station includes means for generating downlink control information (DCI). The DCI includes a first indication that first information scheduled for transmission on a first carrier of a plurality of carriers is a duplication of or combinable with second information scheduled for transmission on a second carrier of the plurality of carriers. The base station also includes means for sending the DCI to at least one wireless communication device.

In one aspect, the disclosure provides an article of manufacture for use by a wireless communication device in a wireless communication network. The article includes a computer-readable medium having stored therein instructions executable by one or more processors of the wireless communication device to generate downlink control information (DCI). The DCI includes a first indication that first information scheduled for transmission on a first carrier of a plurality of carriers is a duplication of or combinable with second information scheduled for transmission on a second carrier of the plurality of carriers. The computer-readable medium also has stored therein instructions executable by one or more processors of the wireless communication device to send the DCI to at least one wireless communication device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
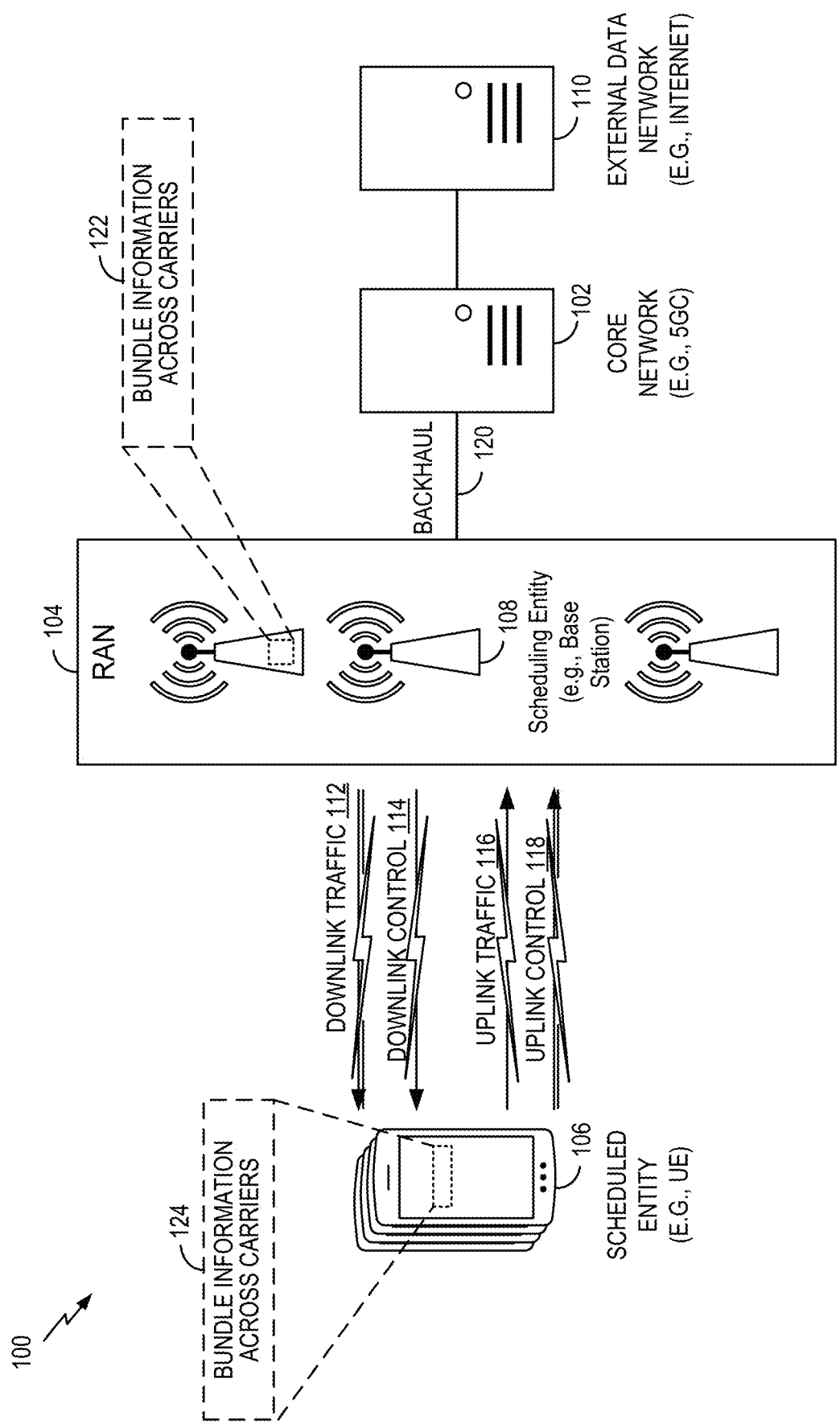
FIG. 1 is a schematic illustration of a wireless communication system within which aspects of the disclosure may be implemented.

Various aspects of the disclosure relate to indicating bundling across carriers (e.g., across cells). In some aspects, bundling may involve sending information over multiple carriers (e.g., information sent from or to multiple cells) where the information sent over the carriers is combinable at a receiver. For example, a communication device may send the same set of information (e.g., transport blocks with the same content) via multiple carriers, send different redundancy versions of a set of information via different carriers, send information via different beams on different carriers, or send information using a combination of these techniques. The disclosure relates in some aspects to indicating whether bundling is applied across carriers (e.g., across cells). For example, a single instance of downlink control information (e.g., the downlink control information sent via a single time slot) that schedules transmissions on multiple carriers (e.g., multiple component carriers) may include an indication of whether bundling is applied across all or a subset of the scheduled carriers. A single instance of downlink control information may be referred to herein as a DCI or the DCI.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. The RAN 104 includes a plurality of base stations 108. By virtue of the wireless communication system 100, the UE 106 may be enabled to carry out data communication with an external data network 110, such as (but not limited to) the Internet.

In accordance with various aspects of the disclosure, the RAN 104 (e.g., a base station 108) may be configured to bundle information across carriers 122 and indicate (e.g., in a DCI) whether bundling is applied across two or more carriers scheduled by the DCI. The base station 108 may further be configured to perform operations related to the bundling. For example, the base station 108 may send to the UE 106 and/or receive information from the UE 106 on one or more component carriers depending on how the bundling is configured by the DCI. In addition, the UE 106 may be configured to bundle information across carriers 124 and receive an indication (e.g., via a DCI) of whether bundling is applied across two or more carriers (e.g., scheduled by the DCI) and for performing operations related to the bundling. For example, the UE 106 may send or receive information on one or more component carriers depending on how the bundling is configured. These and other aspects of indicating cross-carrier bundling are described in more detail after the description of the wireless communication system 100 that follows.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

The actual telecommunication standard, network architecture, and/or communication standard used will depend on the specific application and the overall design constraints imposed on the system. For purposes of illustration, the following may describe various aspects in the context of a 5G and/or LTE system. It should be appreciated, however, that the teachings herein may be used in other systems as well. Thus, references to functionality in the context of 5G and/or LTE terminology should be understood to be equally applicable to other types of technology, networks, components, signaling, and so on.

As mentioned above, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a transmit-receive point (TRP), a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station. accordingly, the functionality of a base station as discussed herein may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity.

In some aspects, a base station may refer to a physical entity that incorporates radio head functionality for a particular physical cell. In some aspects, base station may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices.

The radio access network 104 is further illustrated supporting wireless communication for multiple mobile apparatuses. A mobile apparatus may be referred to as a user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may be a cellular device, an Internet of Things (IoT) device, a cellular IoT (CIoT) device, an LTE wireless cellular device, a machine-type communication (MTC) cellular device, a smart alarm, a remote sensor, a smart phone, a mobile phone, a smart meter, a personal digital assistant (PDA), a personal computer, a mesh node, a tablet computer, etc. A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
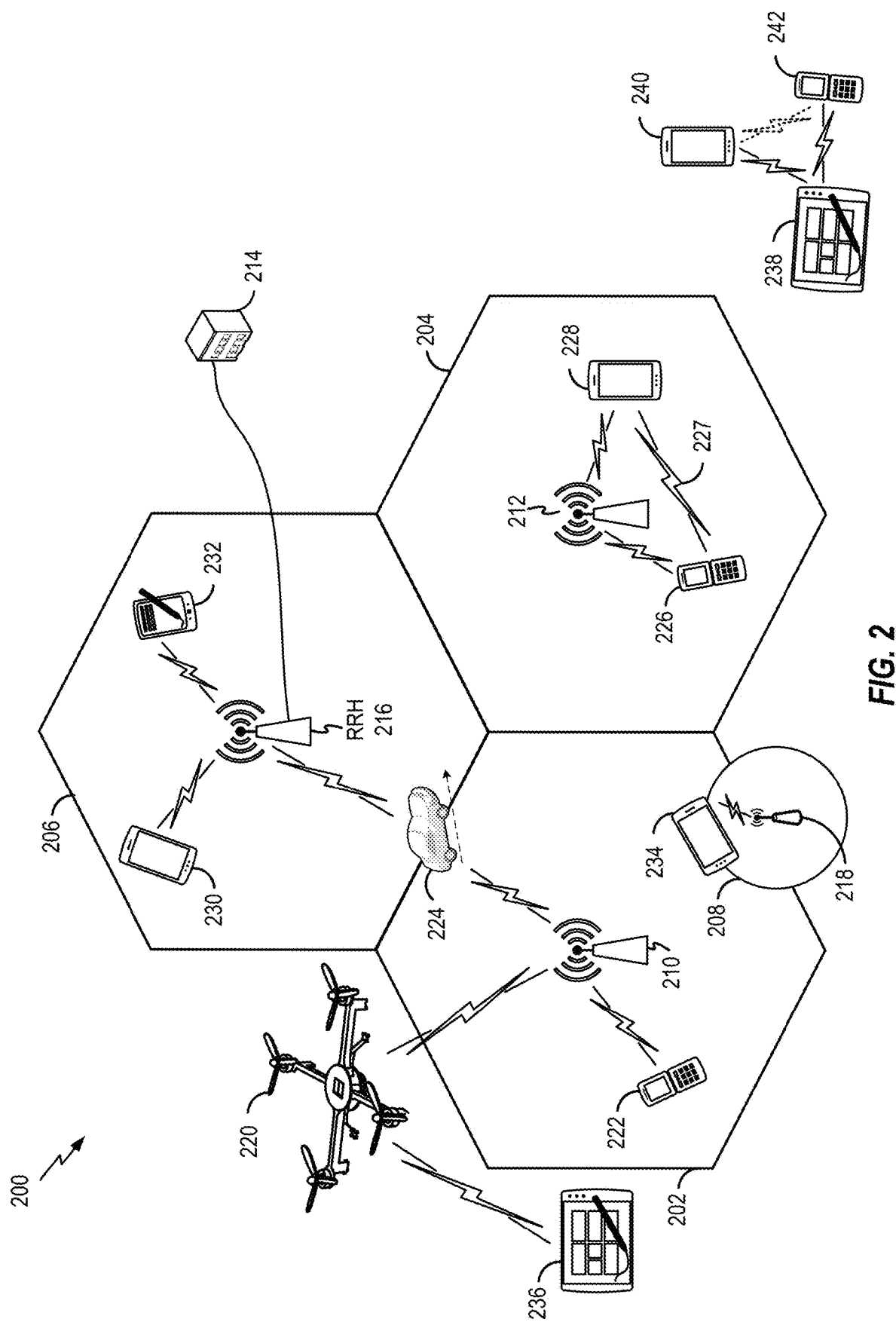
FIG. 2 is a conceptual illustration of a radio access network within which aspects of the disclosure may be implemented.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Channel coding may be used for transmissions over the radio access network 200 to obtain a low block error rate (BLER) while still achieving very high data rates. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Figure 3:
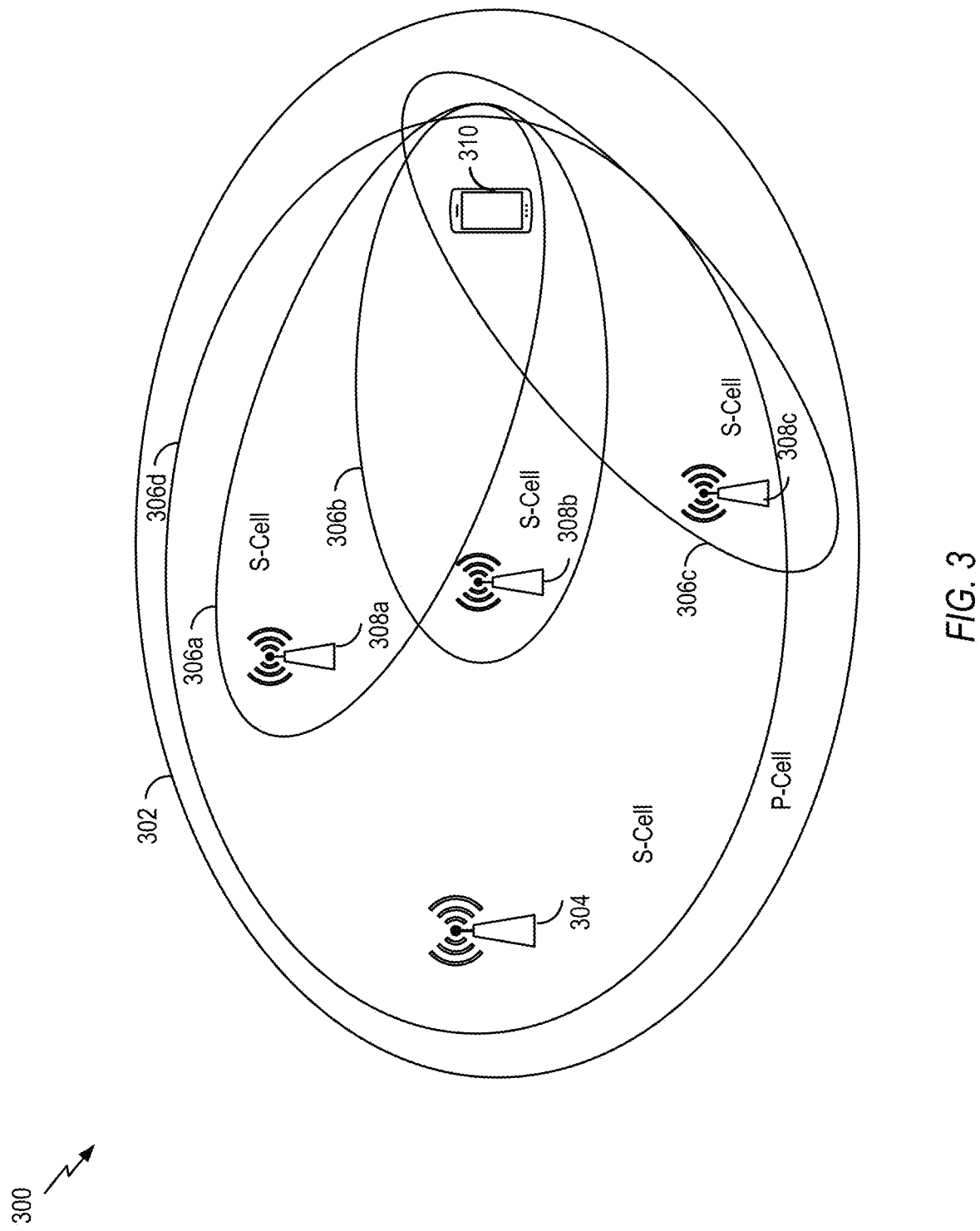
FIG. 3 is a conceptual illustration of a multi-cell transmission environment within which aspects of the disclosure may be implemented.

5G-NR networks may further support carrier aggregation of component carriers transmitted from different transmission and reception points (TRPs) in a multi-cell transmission environment. In some aspects, the term component carrier refers to a carrier frequency (or band) utilized for communication within a cell. An example of a multi-cell transmission environment 300 is shown in FIG. 3. The multi-cell transmission environment 300 includes a primary serving cell (PCell) 302 and one or more secondary serving cells (SCells) 306a, 306b, 306c, and 306d. The PCell 302 may be referred to as the anchor cell that provides a radio resource control (RRC) connection to the UE. In some examples, the PCell and the SCell may be co-located (e.g., different TRPs at the same location).

When carrier aggregation is configured, one or more of the SCells 306a-306d may be activated or added to the PCell 302 to form the serving cells serving a user equipment (UE) 310. Each serving cell corresponds to a component carrier (CC). The CC of the PCell 302 may be referred to as a primary CC, and the CC of a SCell 306a-306d may be referred to as a secondary CC. The PCell 302 and one or more of the SCells 306 may be served by a respective base station 304 and 308a-308c or scheduling entity similar to those illustrated in any of FIGS. 1 and 2. In the example shown in FIG. 3, SCells 306a-306c are each served by a respective base station 308a-308c. However, SCell 306d is co-located with the PCell 302. For example, base station 304 may include multiple TRPs, each supporting a different carrier. The coverage of the PCell 302 and SCell 306d may differ since component carriers in different frequency bands may experience different path loss.

The PCell 302 may add or remove one or more of the SCells 306a-306d to improve reliability of the connection to the UE 310 and/or increase the data rate. However, the PCell 302 may only be changed upon a handover to another PCell.

In some examples, the PCell 302 may utilize a first radio access technology (RAT), such as LTE, while one or more of the SCells 306 may utilize a second RAT, such as 5G-NR. In this example, the multi-cell transmission environment may be referred to as a multi-RAT—dual connectivity (MR-DC) environment. In some examples, the PCell 302 may be a low band cell, and the SCells 306 may be high band cells. A low band (LB) cell uses a CC in a frequency band lower than that of the high band cells. For example, the high band cells may use mmWave CC, and the low band cell may use a CC in a band (e.g., sub-6 GHz band) lower than mmWave. In general, a cell using a mmWave CC can provide greater bandwidth than a cell using a low band CC. In addition, when using above-6 GHz frequency (e.g., mmWave) carriers, beamforming may be used to transmit and receive signals.

The PCell 302 is responsible not only for connection setup, but also for radio resource management (RRM) and radio link monitoring (RLM) of the connection with the UE 310. For example, the PCell 302 may activate one or more of the SCells (e.g., SCell 306a) for multi-cell communication with the UE 310. In some examples, the PCell may activate the SCell 306a on an as-needed basis instead of maintaining the SCell activation when the SCell 306a is not utilized for data transmission/reception in order to reduce power consumption by the UE 310. However, there is a delay involved in activating the SCell 306a, primarily as a result of the time involved in time/frequency synchronization between the UE 310 and the SCell 306a. For example, in order for the UE 310 to synchronize with the SCell 306a, the UE 310 and/or SCell 306a may measure or otherwise utilize one or more reference signals communicated between the UE 310 and the SCell 306a. Examples of reference signals may include, but are not limited to, aperiodic or semi-persistent downlink CSI-RSs, downlink synchronization signal blocks (SSBs), and/or uplink SRSs.

The disclosure relates in some aspects to a single DCI indicating joint bundling across multiple carriers (e.g., across CCs or cells). This scheme may be used, for example, in NR dynamic spectrum sharing (DSS). In DSS, cross-carrier scheduling may involve, for example, a physical downlink control channel (PDCCH) of a secondary cell (S Cell) or a primary cell (P Cell) scheduling a physical downlink shared channel (PDSCH) or a physical uplink shared channel (PUSCH) on a P Cell and/or an S Cell.

Figure 4:
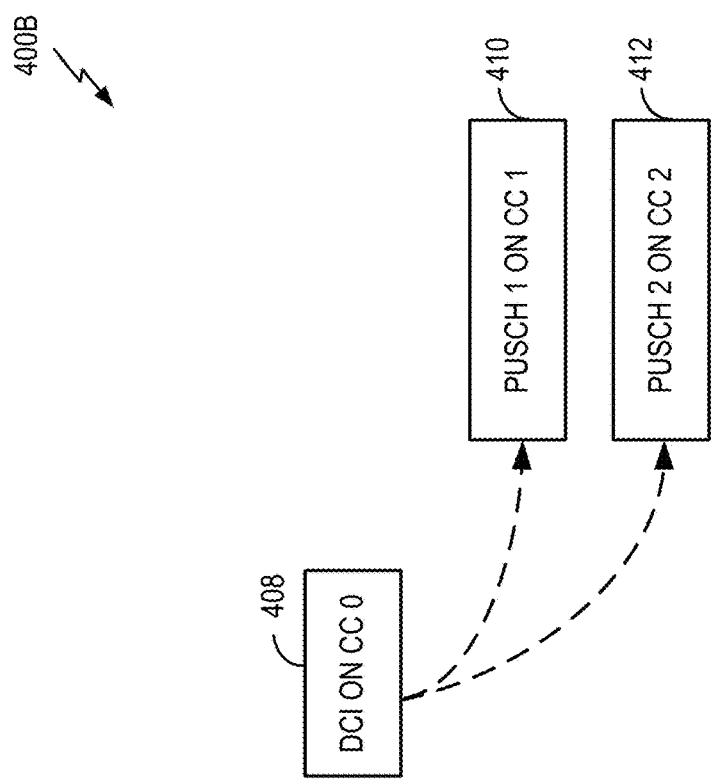
FIG. 4 is a block diagram conceptually illustrating a DCI that schedules multiple carriers in accordance with some aspects of the disclosure.

FIG. 4 illustrates two examples where a single DCI schedules multiple carriers. In a first example 400A, a DCI 402 sent on a first component carrier (designated CC 0 in FIG. 4) schedules a first PDSCH 404 (designated PDSCH 1) on a second CC (designated CC 1) and schedules a second PDSCH 406 (designated PDSCH 2) on a third CC (designated CC 2). In a second example 400B, a DCI 408 schedules a first PUSCH 410 (designated PUSCH 1) on the second CC (CC 1) and a second PUSCH 412 (designated PUSCH 2) on the third CC (CC 2).

In various aspects of the disclosure, when a single DCI schedules transmissions on multiple CCs, the DCI may indicate whether bundling is applied across all or a subset of the scheduled CCs. By indicating the bundling in this way, a device that receives the DCI can efficiently determine whether bundling is used, where the bundling is used (e.g., on which CCs), and how the bundling is configured.

In some aspects, the term bundling as used herein relates to transmitting, on different CCs (cells), first information that is a duplication of a second information. For example, transport blocks (TBs) including the same information may be sent on different CCs. In some aspects, the term bundling as used herein relates to communicating, on different CCs (cells), first information that is combinable with second information. For example, a first data set may be sent on a first CC and second data set may be sent on a second CC. The data sets may be generated such that a device that receives the data sets is able to combine the two data sets to improve the quality of the received data. For example, a UE may combine data sets received from a gNB to improve the downlink (DL) signal to noise plus interference ratio (SINR). As another example, a gNB may combine data sets received from a UE to improve the uplink (UL) SINR. In some aspects, the term bundling as used herein relates to communicating first information and second information via different beams on different CCs (cells). The beams may be configured such that a device that receives the first information via a first beam on one CC and the second information via a second beam on another CC is able to combine the two data sets to improve the quality of the received information.

Various types of first information and second information may be bundled on different CCs scheduled by a single DCI. In some aspects, the information to be bundled may include: a demodulated reference signal (DMRS), PDSCH traffic, PUSCH traffic, physical uplink control channel (PUCCH) control information, physical random access channel (PRACH) information, a sounding reference signal (SRS), or a channel state information reference signal (CSI-RS). Other information may be bundled in other examples.

In some aspects, different redundancy versions (RVs) may be used to provide combinable first information and second information that are sent on different CCs. For example, a device may send first information and second information associated with one RV on one CC and send first information and second information associated with a different RV on another CC. In this scenario, the DCI may indicate the different RVs to be used on the different CCs.

RVs may be used, for example, in a hybrid automatic repeat request (HARQ) scheme. HARQ is a technique in which the integrity of packet transmissions (e.g., code blocks) may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. In chase combining HARQ (HARQ-CC), a retransmitted code block is identical to the original transmission of the code block. That is, if a code block is not decoded properly at the receiving device, resulting in a NACK, then the transmitting device may retransmit the full code block including information identical to the original transmission. The information may then ideally be obtained error-free by virtue of a process called soft combining, where the redundant bits from the retransmission may be combined before decoding to increase the probability of correct reception of each bit. On the other hand, in incremental redundancy HARQ (HARQ-IR), the retransmitted code block may be different from the originally transmitted code block, and further, if multiple retransmissions are made, each retransmission may differ from one another. Here, retransmissions may include different sets of coded bits: for example, corresponding to different code rates or algorithms; corresponding to different portions of the original code block, some of which may not have been transmitted in the original transmission; corresponding to forward error correction (FEC) bits that were not transmitted in the original transmission; or other suitable schemes. As with HARQ-CC, here, the information may be obtained error-free by utilizing soft combining to combine the retransmitted bits with the original transmitted bits.

Figure 5:
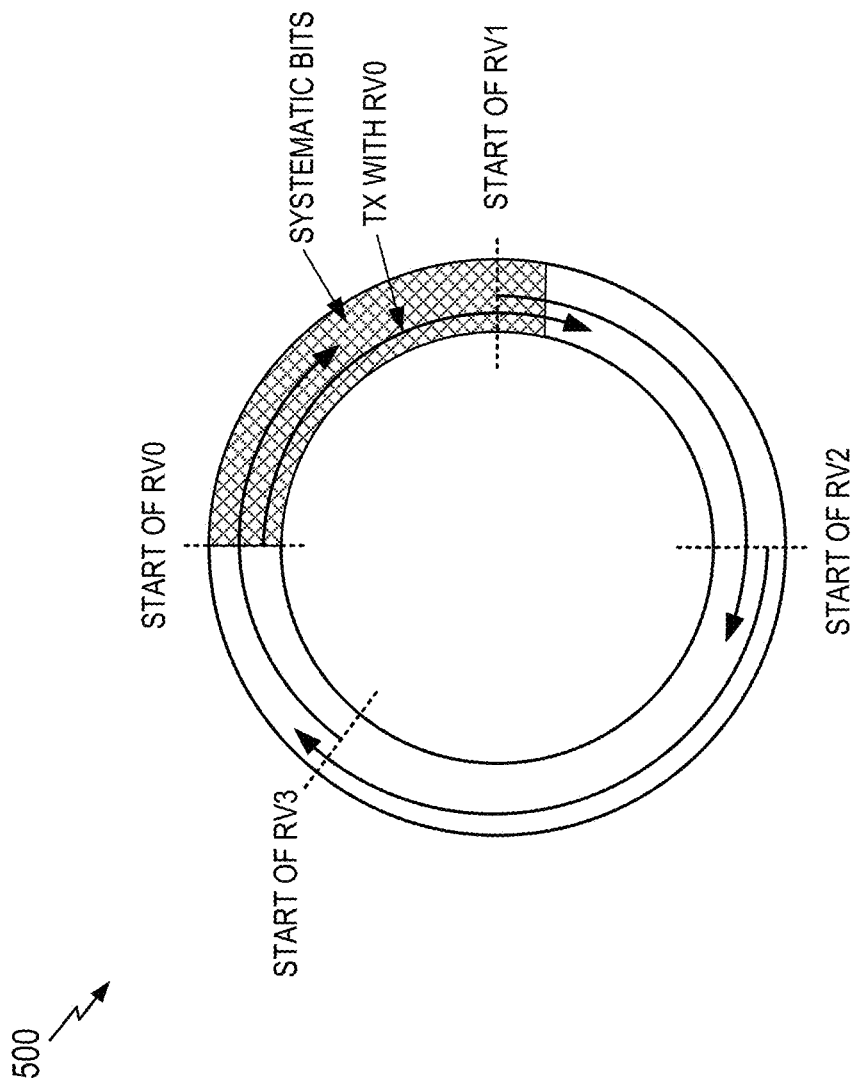
FIG. 5 is a conceptual illustration of redundancy versions in accordance with some aspects of the disclosure.

NR uses low density parity check (LDPC) codes for DL shared channels. LDPC codes utilize HARQ-IR to send different redundancy versions (RVs) of data with each retransmission. For example, four redundancy versions may be sent in the following default order: redundancy version 0 (RV0), redundancy version 2 (RV2), redundancy version 3 (RV3), and redundancy version 1 (RV1). Each redundancy version may include systematic bits (e.g., bits carrying the information to be transmitted) and/or parity bits (e.g., bits carrying redundant information produced from combinations of the original information). For LDPC codes, not all RVs contain the same amount of systematic bits. As shown in the coding illustration 500 of FIG. 5, RV0 and RV3 contain a significant number of systematic bits and are, as a result, self-decodable (e.g., it may be possible to decode the data using these bits, without the need for additional bits). In contrast, RV1 and RV2 do not contain a significant number of systematic bits (e.g., they may primarily include parity bits) and are, as a result, not self-decodable (e.g., it is generally not possible to decode the data using these bits alone). Other types of RVs may be used in other examples.

In some aspects, different beams may be used to provide combinable first information and second information that are sent on different CCs. Beamforming techniques may be used to counteract or reduce the effect of attenuation and provide a highly directional communication beam that uses the wireless communication channels more effectively. Beamforming generally utilizes an array of antennas configured for directional signal transmission or reception. To transmit a beam by beamforming, the phase and relative amplitude of the signal transmitted by each transmitter or antenna are controlled such that a pattern of constructive and destructive interference in the wavefront is created. At the receiver, signals from different antennas or sensors are combined to recover the beamformed signal. In some examples, a device (e.g., a base station) may include two or more TRPs, each communicating on a different CC. The base station may use one beam to send first information and second information on one CC and use a different beam to send first information and second information on another CC. In this scenario, the DCI may indicate the different beams to be used on the different CCs.

For scheduled UL signals, a DCI may instruct a UE to transmit UL signals that are bundled (e.g., combinable by the gNB) on different CCs. In response, the UE may send the same contents (e.g., TBs) on different CCs. As another example, the UE may respond by sending information associated with the same or different RVs on different CCs. As yet another example, the UE may send information via different beams on different CCs. A UE could also use a combination of these techniques (e.g., different RVs and different beams).

For scheduled DL signals, the DCI may instruct the UE to receive DL signals that are bundled (e.g., combinable by the UE) on different CCs. That is, the gNB may send the same contents (e.g., TBs) on different CCs, the gNB may sent information associated with the same or different RVs on different CCs, the gNB may send information via different beams on different CCs, or the gNB may use a combination of these techniques (e.g., different RVs and different beams).

The DCI may indicate whether a UE is to send bundled UL feedback signals (e.g., Ack/Nack) on different CCs (e.g., feedback signals that are combinable by a gNB). If bundled feedback signals are indicated by the DCI, the DCI may indicate a corresponding configuration such as the beams to use on different CCs.

Figure 6:
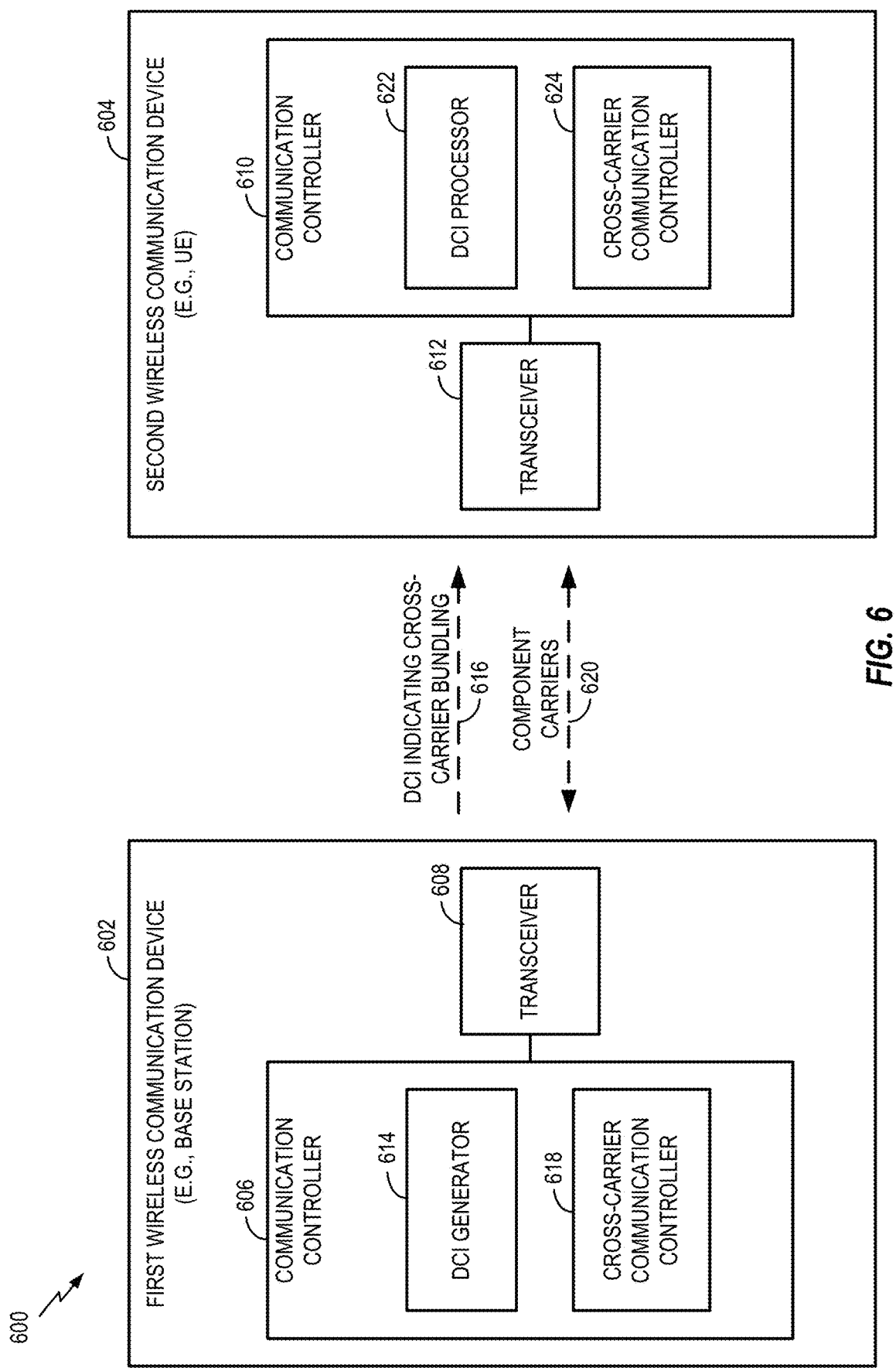
FIG. 6 is a block diagram illustrating a wireless communication system where downlink control information indicates cross-carrier bundling in accordance with some aspects of the disclosure.

FIG. 6 is a schematic illustration of a wireless communication system 600 that may be used to provide cross-carrier bundling as taught herein. The wireless communication system 600 includes a first wireless communication device 602 (e.g., a base station) and a second wireless communication device 604 (e.g., a UE), and potentially other devices (not shown). In some implementations, the first device 602 may correspond to a BS 108 (e.g., a gNB, a transmit receive point, etc.) of FIG. 1. In some implementations, the second device 604 may correspond to the UE 106 of FIG. 1.

The first device 602 includes a communication controller 606 for controlling communications with (e.g. transmitting to and/or receiving from) the second device 604 and/or other devices via a transceiver 608. The second device 604 includes a communication controller 610 for controlling communications with (e.g. transmitting to and/or receiving from) the first device 602 and/or other devices via a transceiver 612.

The communication controller 606 includes a DCI generator 614 for generating a DCI 616 that indicates cross-carrier bundling as taught herein. For example, the DCI generator 614 may generate a DCI that includes one or more indications of: which CCs are bundled, what contents/signals are bundled, how the bundling is to be performed (e.g., identical contents, different RVs, different beams, etc.), and so on.

The communication controller 606 also includes a cross-carrier communication controller 618 for sending or receiving contents/signals via multiple CCs 620 as taught herein. For example, for downlink communication, the cross-carrier communication controller 618 may generate contents/signals that are bundled on the CCs 620. For uplink communication, the cross-carrier communication controller 618 may process (e.g. combine) contents/signals that are bundled on the CCs 620.

The communication controller 610 of the second device 604 includes a DCI processor 622 for receiving and analyzing the DCI 616. For example, the DCI processor 622 may parse the indication(s) included in the DCI to determine: which CCs are bundled, what contents/signals are bundled, how the bundling is to be performed (e.g., identical contents, different RVs, different beams, etc.), and so on.

The communication controller 610 also includes a cross-carrier communication controller 624 for sending or receiving contents/signals via the CCs 620 as taught herein. For example, for uplink communication, the cross-carrier communication controller 624 may generate contents/signals that are bundled on the CCs 620. For downlink communication, the cross-carrier communication controller 618 may process (e.g. combine) contents/signals that are bundled on the CCs 620.

Figure 7:
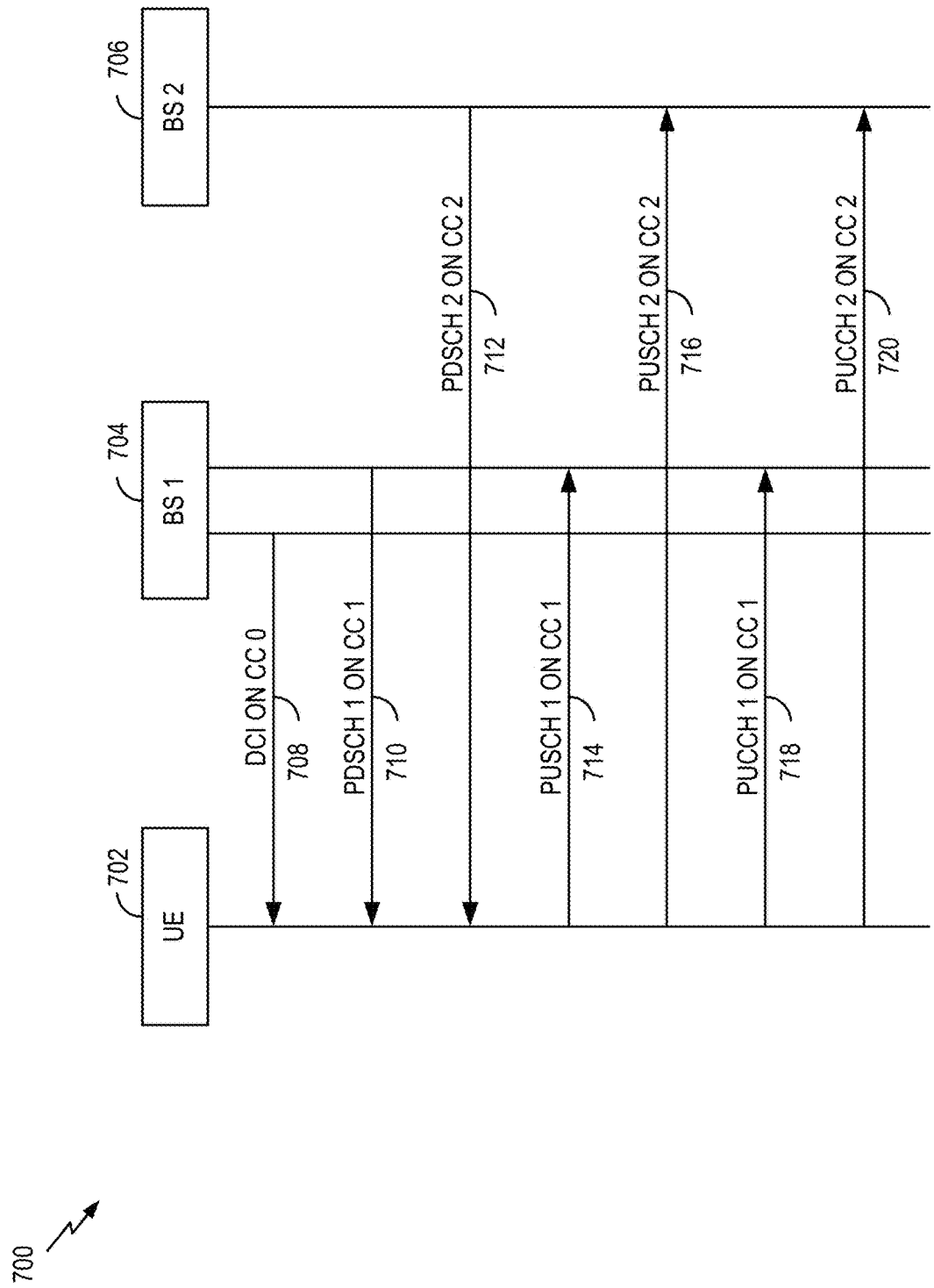
FIG. 7 is a timing diagram illustrating signaling between communication devices that communicate on multiple carriers in accordance with some aspects of the disclosure.

FIG. 7 illustrates an example of signaling for cross-carrier bundling between devices of a wireless communication system 700. The system 700 includes a UE 702, a first BS 704, and a second BS 706. In some implementations, the UE 702 may correspond to the UE 106 of FIG. 1. In this example, the first BS 704 provides two cells (CO and CC1), while the second BS 706 provides one cell (CC2). In other examples, all of the cells (CC0, CC1, and CC3) may be provided by a single BS. In some implementations, the BS 704 or the BS 706 may correspond to a BS 108 (e.g., a gNB, a transmit receive point, etc.) of FIG. 1.

At a step 708, the first BS 704 sends a DCI on CC0. In accordance with the teachings herein, the DCI indicates that there is bundling on CC1 and CC2.

As a first example, the DCI may indicate that PDSCH is bundled across CC1 and CC2. In this case, the first BS 704 sends PDSCH 1 to the UE 702 on CC1 at step 710 and the second BS 706 sends PDSCH 2 to the UE 702 on CC2 at step 712.

As a second example, the DCI may indicate that PUSCH is bundled across CC1 and CC2. In this case, the UE 702 sends PUSCH 1 to the first BS 704 on CC1 at step 714 and the UE 702 sends PUSCH 2 to the second BS 706 on CC2 at step 716.

As a third example, the DCI may indicate that PUCCH is bundled across CC1 and CC2. In this case, the UE 702 sends PUCCH 1 to the first BS 704 on CC1 at step 718 and the UE 702 sends PUCCH 2 to the second BS 706 on CC2 at step 720.

Other types of signaling may be used in other examples.

Figure 8:
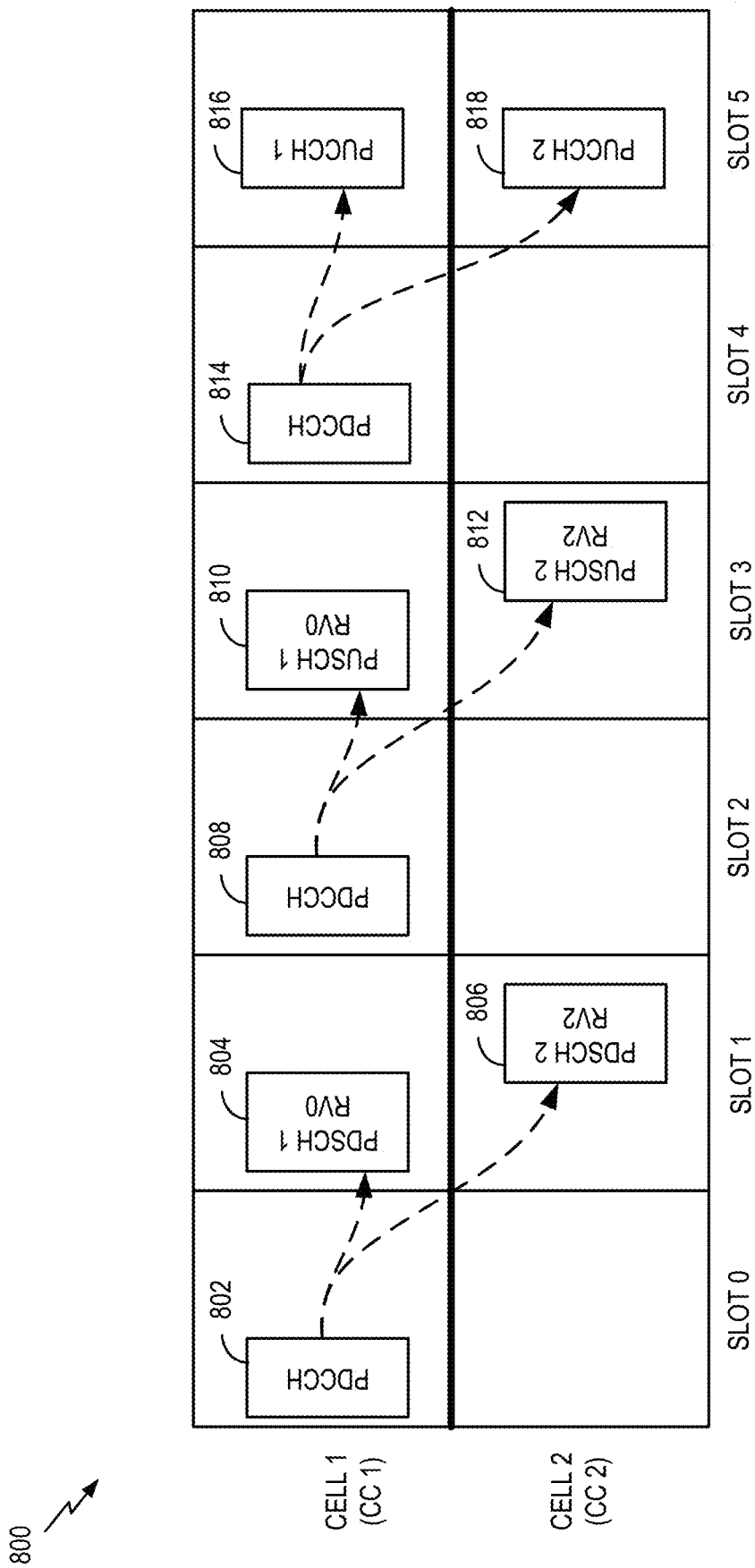
FIG. 8 is a block diagram conceptually illustrating scheduling of uplink information and downlink information on multiple carriers in accordance with some aspects of the disclosure.

FIG. 8 illustrates an example of scheduling 800 that may be specified by a DCI. As discussed herein the DCI may be carried in a PDCCH in some examples.

In slot 0, a PDCCH 802 of a first cell (CC 1) schedules bundled PDSCH transmissions in slot 1. Specifically, the DCI (not shown in FIG. 8) of the PDCCH 802 schedules a first PDSCH 804 (PDSCH 1) with RV0 on CC1 and schedules a second PDSCH 806 (PDSCH 2) with RV2 on CC2. The PDSCH 1 and PDSCH 2 have the same transport block or data information to be delivered. Thus, a gNB (not shown in FIG. 8) may encode PDSCH information to obtain an RV0 data set and an RV2 data set. The gNB may then send the RV0 data set on CC1 and send the RV2 data set on CC2. A UE (not shown in FIG. 8) that receives the PDCCH 802, the first PDSCH 804 and the second PDSCH 806 can thereby determine that the first PDSCH 804 is an RV0 data set and the second PDSCH 806 is an RV2 data set. Accordingly, the UE will be able to decode the first PDSCH 804 and the second PDSCH 806 (e.g., combine the data sets) to obtain the downlink information.

In slot 2, a PDCCH 808 of the first cell (CC 1) schedules bundled PUSCH transmissions in slot 3. Specifically, the DCI (not shown in FIG. 8) of the PDCCH 808 schedules a first PUSCH 810 (PUSCH 1) with RV0 on CC1 and schedules a second PUSCH 812 (PUSCH 2) with RV2 on CC2. The PUSCH 1 and PUSCH 2 have the same transport block or data information to be delivered. Thus, a UE (not shown in FIG. 8) may encode PUSCH information to obtain an RV0 data set and an RV2 data set. The UE may then send the RV0 data set on CC1 and send the RV2 data set on CC2. A gNB (not shown in FIG. 8) that sent the PDCCH 808 and receives the first PUSCH 810 and the second PUSCH 812 can thereby determine that the first PUSCH 810 is an RV0 data set and the second PUSCH 812 is an RV2 data set. Accordingly, the gNB will be able to decode the first PUSCH 810 and the second PUSCH 812 (e.g., combine the data sets) to obtain the uplink information.

In slot 4, a PDCCH 814 of the first cell (CC 1) schedules bundled PUCCH transmissions in slot 5. Specifically, the DCI (not shown in FIG. 8) of the PDCCH 814 schedules a first PUCCH 816 (PUCCH 1) on CC1 and schedules a second PUCCH 818 (PUCCH 2) on CC2. The PUCCH 1 and PUCCH 2 have the same uplink control information to be delivered. Thus, a UE (not shown in FIG. 8) may duplicate or split PUCCH information to obtain PUCCH 1 and PUCCH 2. The UE may then send the first PUCCH 816 on CC1 and send the second PUCCH 818 on CC2. A gNB (not shown in FIG. 8) that sent the PDCCH 84 and receives the first PUCCH 816 and the second PUCCH 818 can thereby combine the PUCCH information obtain the uplink control information.

The disclosure relates in some aspects to an RV mapping scheme. For example, a particular RV value may be mapped to a set of RV values for different CCs (cells). In this way, the size (e.g., number of bits) of the RV indication in the DCI may be reduced as compared to, for example, a scheme where there is a separate RV indication for each carrier.

Table 1 illustrates an example of an RV mapping in accordance with the teachings herein. Here the RV in the DCI is two bits. An RV value of 0 in the DCI maps to RV0 for CC1 and RV2 for CC2. An RV value of 2 in the DCI maps to RV2 for CC1 and RV3 for CC2. An RV value of 2 in the DCI maps to RV2 for CC1 and RV3 for CC2. An RV value of 3 in the DCI maps to RV3 for CC1 and RV1 for CC2. An RV value of 1 in the DCI maps to RV1 for CC1 and RV0 for CC2. Other RV mappings may be used in other examples. As another example, an RV mapping may be configured by the RRC signaling. For example, the RRC may configure an offset for the RV. The RV in the DCI indicates the RV value to be used in CC1, and the RV to be used in CC2 is derived based on the RV indicated in the DCI and the offset configured by the RRC signaling.

TABLE 1

| RV IN DCI | RV FOR PDSCH/PUSCH IN CC1, CC2 |
|---|---|
| 0 | 0.2 |
| 2 | 2.3 |
| 3 | 3.1 |
| 1 | 1.0 |

Figure 9:
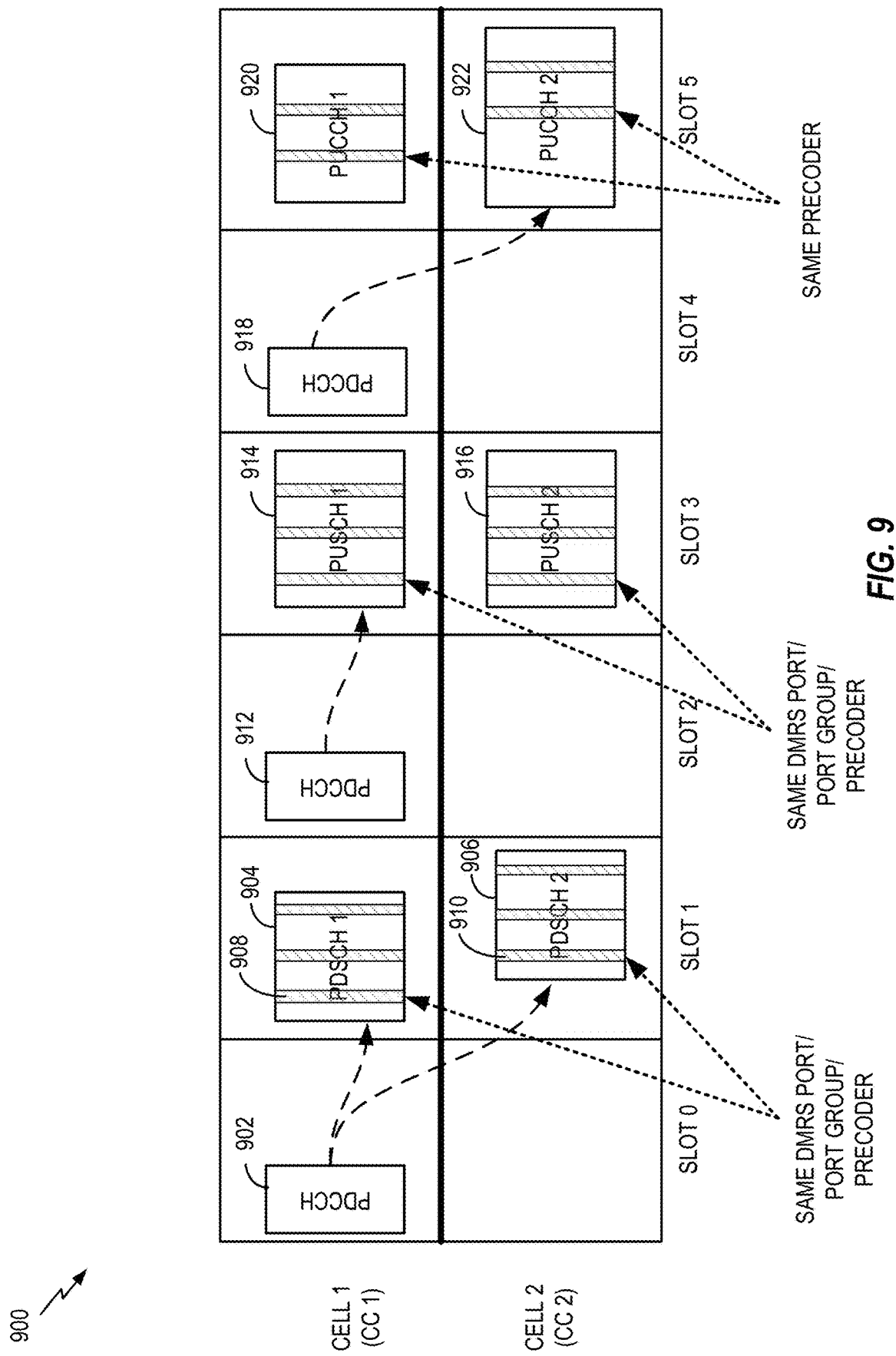
FIG. 9 is a block diagram conceptually illustrating scheduling of uplink information, downlink information, and signaling on multiple carriers in accordance with some aspects of the disclosure.

FIG. 9 illustrates an example of DMRS scheduling 900 that may be specified by a DCI. As discussed herein the DCI may be carried in a PDCCH in some examples.

In slot 0, a PDCCH 902 of a first cell (CC 1) schedules bundled PDSCH transmissions in slot 1. Specifically, the DCI (not shown in FIG. 9) of the PDCCH 902 schedules a first PDSCH 904 (PDSCH 1) on CC1 and schedules a second PDSCH 906 (PDSCH 2) on CC2. In addition, the DCI schedules DMRS in slot 1 as indicated by the narrow diagonally-hatched columns (e.g., DMRS 908 on CC1 and DMRS 910 on CC2). In this case, a gNB (not shown in FIG. 9) may use the same DMRS port (or the same code division multiplexing (CDM) port group) and the same precoder to send DMRS on CC1 and CC2. A UE (not shown in FIG. 9) that receives the PDCCH 902 can thereby effectively recover the first PDSCH 904 and the second PDSCH 906 based on the DMRS to obtain the downlink information. The DMRS 908 on CC1 and DMRS 910 on CC2 can be jointly estimated at the UE for better channel estimation.

In slot 2, a PDCCH 912 of the first cell (CC 1) schedules bundled PUSCH transmissions in slot 3. Specifically, the DCI (not shown in FIG. 9) of the PDCCH 912 schedules a first PUSCH 914 (PUSCH 1) on CC1 and schedules a second PUSCH 916 (PUSCH 2) on CC2. In addition, the DCI schedules DMRS in slot 3 as indicated by the narrow diagonally-hatched columns. In this case, a UE (not shown in FIG. 9) may use the same DMRS port (or the same code division multiplexing (CDM) port group) and the same precoder to send DMRS on CC1 and CC2. A gNB (not shown in FIG. 9) that sends the PDCCH 912 can thereby effectively recover the first PUSCH 914 and the second PUSCH 916 based on the DMRS to obtain the uplink information. The DMRS on CC1 and the DMRS on CC2 can be jointly estimated at the gNB for better channel estimation.

In slot 4, a PDCCH 918 of the first cell (CC 1) schedules bundled PUCCH transmissions in slot 5. Specifically, the DCI (not shown in FIG. 9) of the PDCCH 918 schedules a first PUCCH 920 (PUCCH 1) on CC1 and schedules a second PUCCH 922 (PUCCH 2) on CC2. In addition, the DCI schedules DMRS in slot 3 as indicated by the narrow diagonally-hatched columns. In this case, a UE (not shown in FIG. 9) may use the same precoder to send DMRS on CC1 and CC2. A gNB (not shown in FIG. 9) that sends the PDCCH 918 can thereby effectively recover the first PUCCH 920 and the second PUCCH 922 based on the DMRS to obtain the uplink control information.

Figure 10:
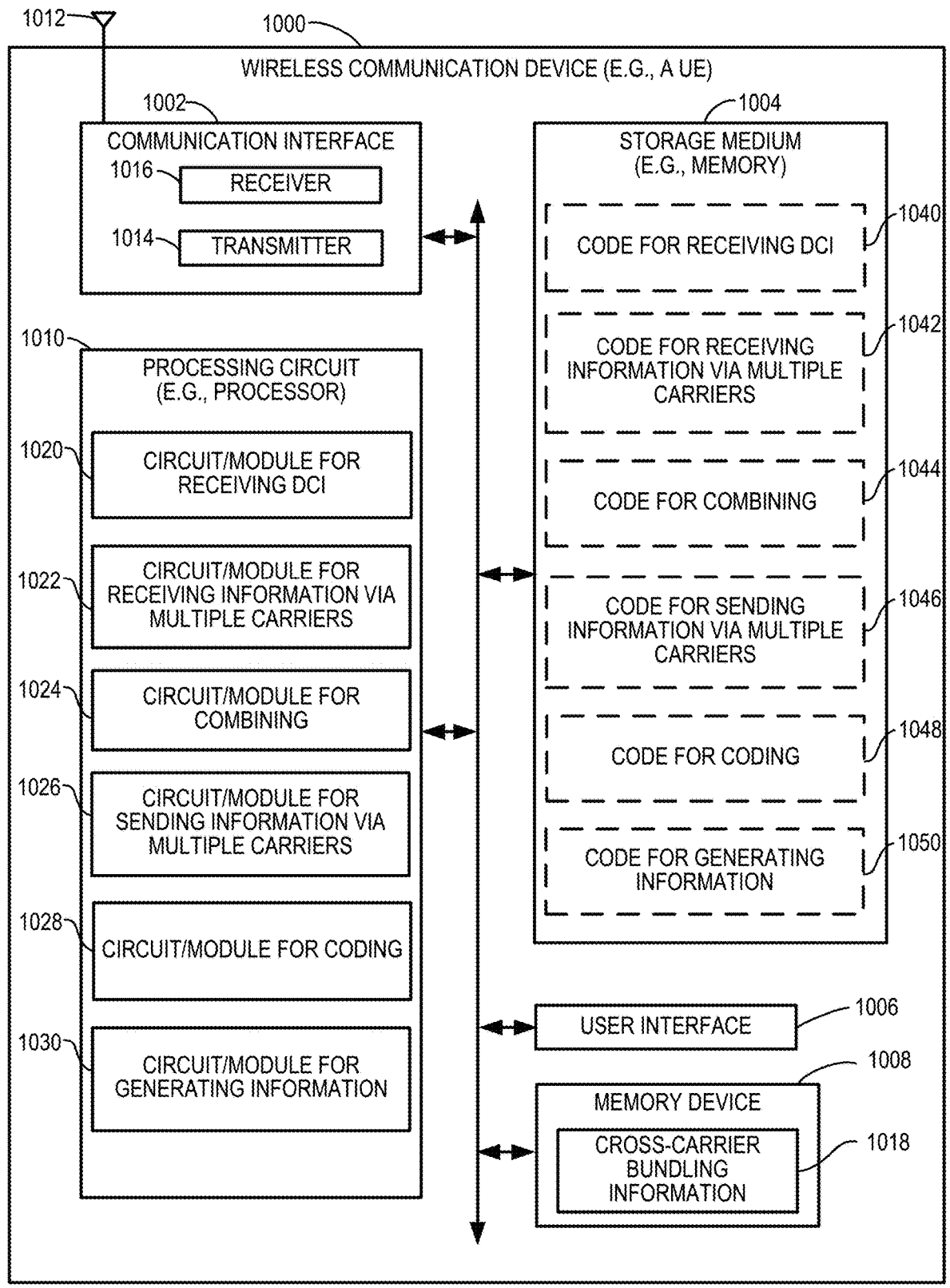
FIG. 10 is a block diagram conceptually illustrating an example hardware implementation of a device for wireless communication in accordance with some aspects of the disclosure.

FIG. 10 illustrates a block diagram of an example hardware implementation of a wireless communication device 1000 configured to communicate according to one or more aspects of the disclosure. The device 1000 could embody or be implemented within a UE, a user terminal, a wireless communication system, a gNB, a transmit receive point (TRP), a base station (BS), an eNode B (eNB), a CPE, or some other type of device that supports wireless communication. In various implementations, the device 1000 could embody or be implemented within an access terminal, an access point, or some other type of device. In various implementations, the device 1000 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 1000 may correspond at least in some aspect to, for example, the UE 106 of FIG. 1.

The device 1000 includes a communication interface (e.g., at least one transceiver) 1002, a storage medium 1004, a user interface 1006, a memory device (e.g., a memory circuit) 1008, and a processing circuit 1010 (e.g., at least one processor). In various implementations, the user interface 1006 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 provides a means for communicating with other devices over a transmission medium. In some implementations, the communication interface 1002 includes circuitry and/or programming adapted to facilitate the communication of information bi-directionally with respect to one or more communication devices in a network. In some implementations, the communication interface 1002 is adapted to facilitate wireless communication of the device 1000. For example, the communication interface 1002 may include a radio frequency (RF) front end (e.g., an RF transmitter and/or an RF receiver). In these implementations, the communication interface 1002 may be coupled to one or more antennas 1012 as shown in FIG. 10 for wireless communication within a wireless communication system. In some implementations, the communication interface 1002 may be configured to interface the device 1000 to one or more other components (other components not shown in FIG. 10). For example, the communication interface 1002 may be configured to interface the processing circuit 1010 to a radio frequency (RF) front end. In some implementations, the communication interface 1002 may be configured for wire-based communication. For example, the communication interface 1002 could be a bus interface, a send/receive interface, or some other type of signal interface including drivers, buffers, receivers, or other circuitry for outputting and/or obtaining signals (e.g., outputting signal from and/or receiving signals into an integrated circuit). The communication interface 1002 can be configured with one or more standalone receivers and/or transmitters, as well as one or more transceivers. In the illustrated example, the communication interface 1002 includes a transmitter 1014 and a receiver 1016. The communication interface 1002 serves as one example of a means for receiving and/or means transmitting.

The memory device 1008 may represent one or more memory devices. As indicated, the memory device 1008 may maintain cross-carrier bundling information 1018 along with other information used by the device 1000. In some implementations, the memory device 1008 and the storage medium 1004 are implemented as a common memory component. The memory device 1008 may also be used for storing data that is manipulated by the processing circuit 1010 or some other component of the device 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium. For example, the storage medium 1004 may be a non-transitory computer-readable medium storing computer-executable code, including code to perform operations as described herein.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the device 1000, external to the device 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming Examples of the processing circuit 1010 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the devices described herein. For example, the processing circuit 1010 may be configured to perform any of the steps, functions, and/or processes described with respect to FIGS. 1-9 and 11. As used herein, the term "adapted" in relation to the processing circuit 1010 may refer to the processing circuit 1010 being one or more of configured, employed, implemented, and/or programmed to perform a particular process, function, operation and/or routine according to various features described herein.

The processing circuit 1010 may be a specialized processor, such as an application-specific integrated circuit (ASIC) that serves as a means for (e.g., structure for) carrying out any one of the operations described in conjunction with FIGS. 1-9 and 11. The processing circuit 1010 serves as one example of a means for transmitting and/or a means for receiving. In various implementations, the processing circuit 1010 may provide and/or incorporate, at least in part, the functionality described above for the second device 604 (e.g., the communication controller 610) of FIG. 6.

According to at least one example of the device 1000, the processing circuit 1010 may include one or more of a circuit/module for receiving DCI 1020, a circuit/module for receiving information via multiple carriers 1022, a circuit/module for combining 1024, a circuit/module for sending information via multiple carriers 1026, a circuit/module for coding (e.g., encoding and/or decoding) 1028, or a circuit/module for generating information 1030. In various implementations, the circuit/module for receiving DCI 1020, the circuit/module for receiving information via multiple carriers 1022, the circuit/module for combining 1024, the circuit/module for sending information via multiple carriers 1026, the circuit/module for coding (e.g., encoding and/or decoding) 1028, or the circuit/module for generating information 1030 may provide and/or incorporate, at least in part, the functionality described above for the second device 604 (e.g., the communication controller 610) of FIG. 6.

As mentioned above, programming stored by the storage medium 1004, when executed by the processing circuit 1010, causes the processing circuit 1010 to perform one or more of the various functions and/or process operations described herein. For example, the programming may cause the processing circuit 1010 to perform the various functions, steps, and/or processes described herein with respect to FIGS. 1-9 and 11 in various implementations. As shown in FIG. 10, the storage medium 1004 may include one or more of code for receiving DCI 1040, code for receiving information via multiple carriers 1042, code for combining 1044, code for sending information via multiple carriers 1046, code for coding (e.g., encoding and/or decoding) 1048, or code for generating information 1050. In various implementations, the code for receiving DCI 1040, the code for receiving information via multiple carriers 1042, the code for combining 1044, the code for sending information via multiple carriers 1046, the code for coding (e.g., encoding and/or decoding) 1048, or the code for generating information 1050 may be executed or otherwise used to provide the functionality described herein for the circuit/module for receiving DCI 1020, the circuit/module for receiving information via multiple carriers 1022, the circuit/module for combining 1024, the circuit/module for sending information via multiple carriers 1026, the circuit/module for coding (e.g., encoding and/or decoding) 1028, or the circuit/module for generating information 1030.

Figure 11:
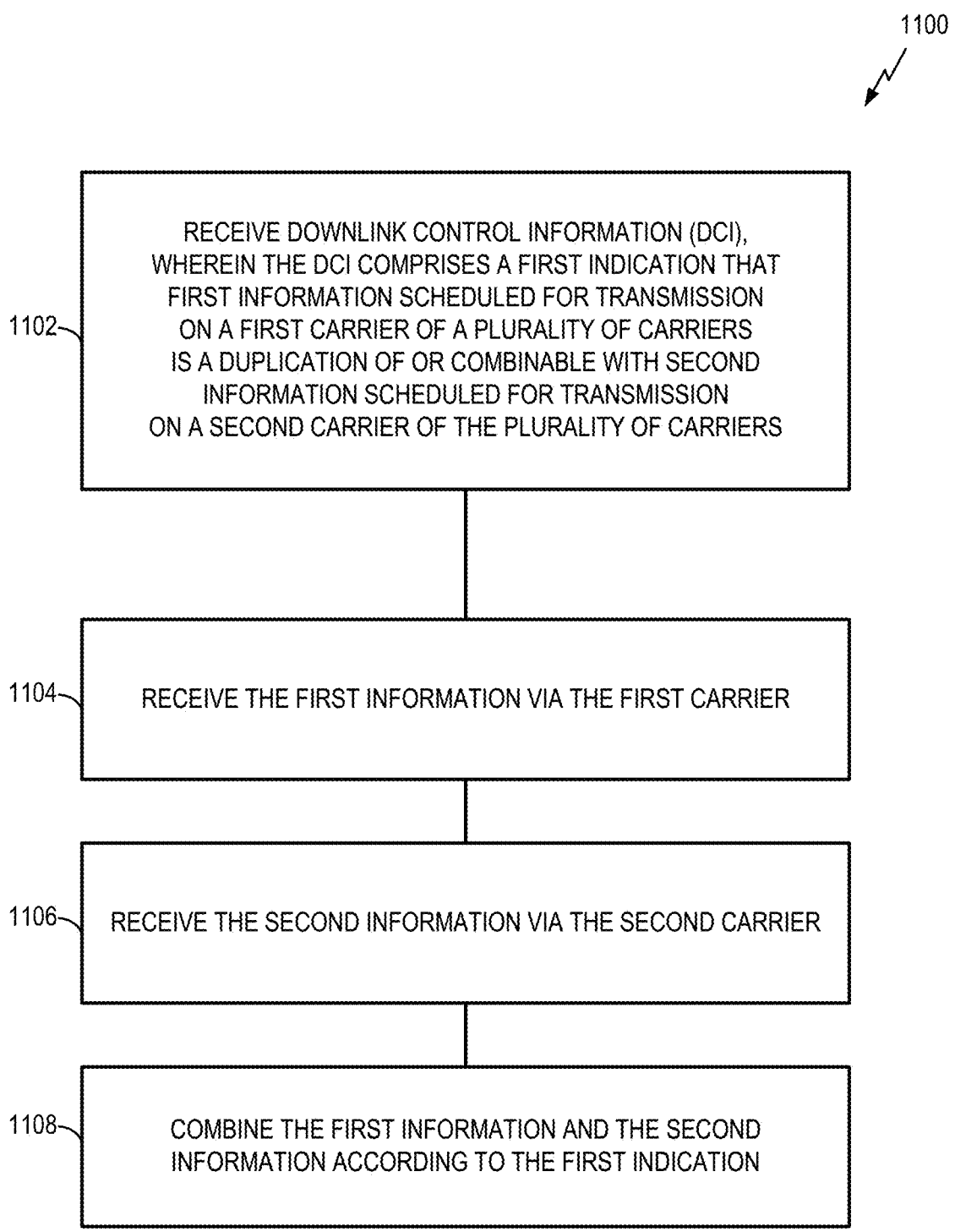
FIG. 11 is a flowchart illustrating an example of a process for providing downlink control in accordance with some aspects of the disclosure.

FIG. 11 illustrates a process 1100 for communication in accordance with some aspects of the disclosure. The process 1100 may take place within a processing circuit (e.g., the processing circuit 1010 of FIG. 10), which may be located in a wireless communication device, a UE, a gNB, a TRP, a BS, an eNB, a CPE, or some other suitable device. Of course, in various aspects within the scope of the disclosure, the process 1100 may be implemented by any suitable device capable of supporting communication-related operations.

At block 1102, a wireless communication device (e.g., a UE) receives downlink control information (DCI). In some aspects, the DCI may include a first indication that first information scheduled for transmission on a first carrier (e.g., a first CC) of a plurality of carriers is a duplication of or combinable with second information scheduled for transmission on a second carrier (e.g., a second CC) of the plurality of carriers. In some aspects, the first indication may indicate that cross-carrier bundling is applied across a subset of the plurality of carriers. In some aspects, the first indication may indicate that cross-carrier bundling is applied across all of the plurality of carriers. In some aspects, the DCI may schedule transmissions on a plurality of carriers.

The first information and the second information may take different forms in different examples. In some aspects, the first information and the second information may include: a physical downlink shared channel (PDSCH), a physical uplink shared channel (PUSCH), a physical uplink control channel (PUCCH), a physical random access channel (PRACH), a sounding reference signal (SRS), a channel state information reference signal (CSI-RS), or an uplink feedback signal.

At block 1104, the device receives the first information via the first carrier.

At block 1106, the device receives the second information via the second carrier.

At block 1108, the device combines the first information and the second information according to the first indication.

In some aspects, the DCI may further include a second indication that specifies a first redundancy version for the first carrier; the second indication may further specify a second redundancy version different from the first redundancy version for the second carrier; and the combining may include a decoding operation based on the first redundancy version and the second redundancy version.

In some aspects, the DCI may further include a second indication that specifies a redundancy version that is mapped to a first redundancy version for the first carrier and a second redundancy version for the second carrier; and the combining may include a decoding operation based on the first redundancy version for the first carrier and the second redundancy version for the second carrier.

In some aspects, the DCI may further include a second indication that specifies a first beam for the first carrier; the second indication may further specify a second beam different from the first beam for the second carrier; the first information may be received via the first beam according to the second indication; and the second information may be received via the second beam according to the second indication.

In some aspects, the first information and the second information may include: a physical downlink shared channel (PDSCH), a physical uplink shared channel (PUSCH), or a physical uplink control channel (PUCCH); and the DCI may further include a second indication that indicates that a demodulation reference signal (DMRS) is duplicated across the first carrier and the second carrier. In some aspects, the process 1100 may further include: receiving a first DMRS via the first carrier according to the indication; receiving a second DMRS via the second carrier according to the indication; combining the first DMRS and the second DMRS; and decoding the first information and the second information based on the combination of the first DMRS and the second DMRS.

In some aspects, the first information and the second information may include: a physical downlink shared channel (PDSCH) or a physical uplink shared channel (PUSCH); the DCI may further include a second indication that specifies a first redundancy version for the first information and a second redundancy version for the second information; and the combining may include a decoding operation based on the first redundancy version for the first information and the second redundancy version for the second information.

In some aspects, the DCI may further include a third indication that specifies a first beam for the first carrier; the third indication may further specify a second beam different from the first beam for the second carrier; the first information may be received via the first beam according to the third indication; and the second information may be received via the second beam according to the third indication.

In some aspects, the DCI may further include a second indication that third information scheduled for transmission on the first carrier is a duplication of or combinable with fourth information scheduled for transmission on the second carrier. In some aspects, the process 1100 may further include: generating the third information according to the second indication; generating the fourth information according to the second indication; sending the third information via the first carrier; and sending the fourth information via the second carrier. In some aspects, the DCI may further include a third indication that specifies a first redundancy version for the first carrier; the third indication may further specify a second redundancy version different from the first redundancy version for the second carrier; the generation of the third information may be based on the first redundancy version according to the third indication; and the generation of the fourth information may be based on the second redundancy version according to the third indication. In some aspects, the DCI may further include a third indication that specifies a redundancy version that is mapped to a first redundancy version for the first carrier and a second redundancy version for the second carrier; the generation of the third information may be based on the first redundancy version according to the third indication; and the generation of the fourth information may be based on the second redundancy version according to the third indication.

In some aspects, the DCI may further include a third indication that specifies a first beam for the first carrier; the third indication may further specify a second beam different from the first beam for the second carrier; the third information may be sent via the first beam according to the third indication; and the fourth information may be sent via the second beam according to the third indication.

In some aspects, a process in accordance with the teachings herein may include any combination of the above operations.

Figure 12:
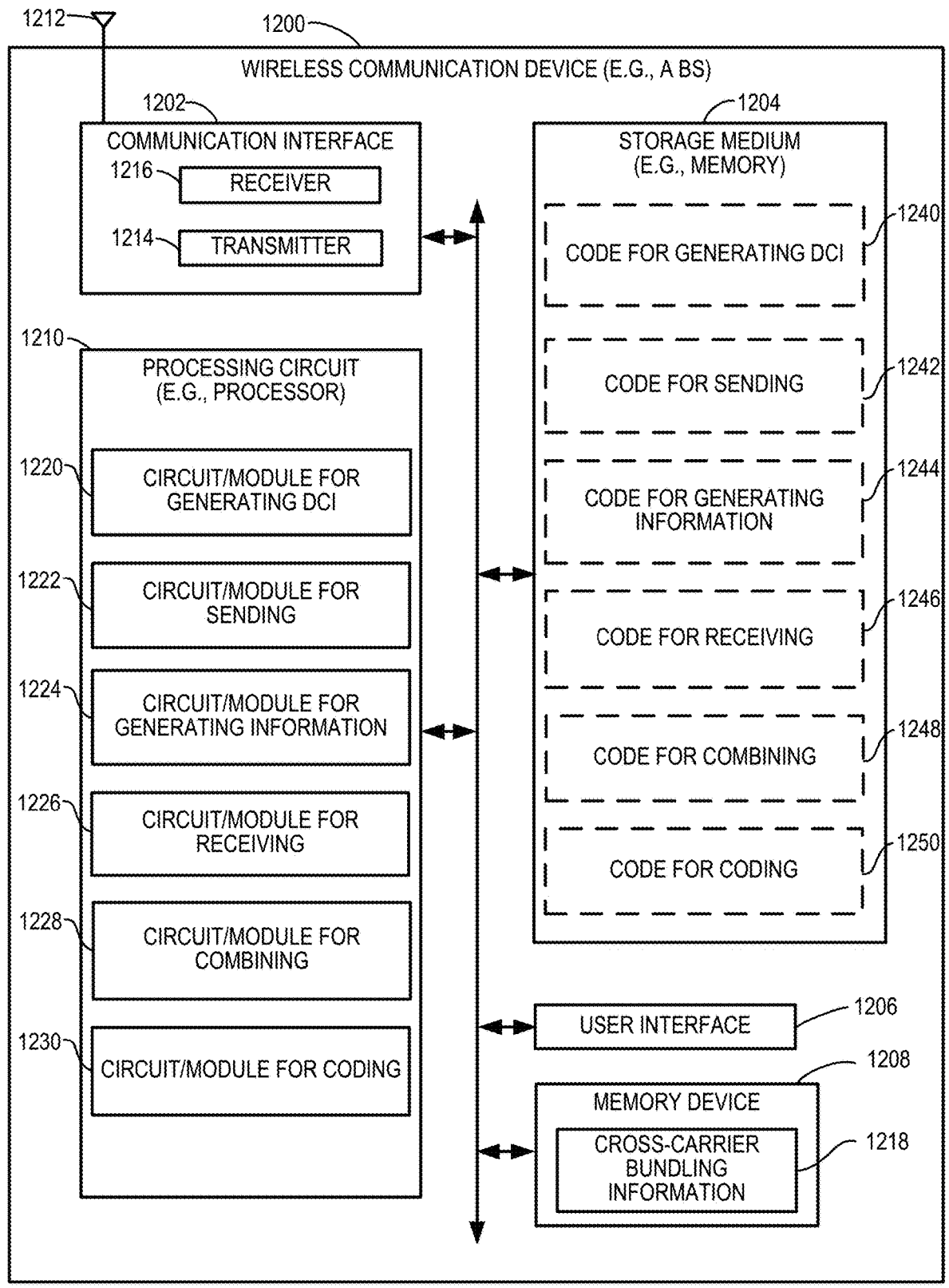
FIG. 12 is a block diagram conceptually illustrating an example hardware implementation of another device for wireless communication in accordance with some aspects of the disclosure.

FIG. 12 illustrates a block diagram of an example hardware implementation of a wireless communication device 1200 configured to communicate according to one or more aspects of the disclosure. The device 1200 could embody or be implemented within a base station (BS), a gNB, a transmit receive point (TRP), an eNode B (eNB), a CPE, or some other type of device that supports wireless communication. In various implementations, the device 1200 could embody or be implemented within an access terminal, an access point, or some other type of device. In various implementations, the device 1200 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 1200 may correspond at least in some aspect to, for example, a base station 108 of FIG. 1.

The device 1200 includes a communication interface 1202 (e.g., at least one transceiver), a storage medium 1204, a user interface 1206, a memory device 1208 (e.g., storing cross-carrier bundling information 1218), and a processing circuit 1210 (e.g., at least one processor). In various implementations, the user interface 1206 may include one or more of: a keypad, a display, a speaker, a microphone, a touchscreen display, of some other circuitry for receiving an input from or sending an output to a user. The communication interface 1202 may be coupled to one or more antennas 1212, and may include a transmitter 1214 and a receiver 1216. In general, the components of FIG. 12 may be similar to corresponding components of the device 1000 of FIG. 10.

According to one or more aspects of the disclosure, the processing circuit 1210 may be adapted to perform any or all of the features, processes, functions, operations and/or routines for any or all of the devices described herein. For example, the processing circuit 1210 may be configured to perform any of the steps, functions, and/or processes described with respect to FIGS. 1-9 and 13. As used herein, the term "adapted" in relation to the processing circuit 1210 may refer to the processing circuit 1210 being one or more of configured, used, implemented, and/or programmed to perform a particular process, function, operation and/or routine according to various features described herein.

The processing circuit 1210 may be a specialized processor, such as an application specific integrated circuit (ASIC) that serves as a means for (e.g., structure for) carrying out any one of the operations described in conjunction with FIGS. 1-9 and 13. The processing circuit 1210 may serve as one example of a means for transmitting and/or a means for receiving. In various implementations, the processing circuit 1210 may provide and/or incorporate, at least in part, the functionality described above for the first device 602 (e.g., the communication controller 606) of FIG. 6.

According to at least one example of the device 1200, the processing circuit 1210 may include one or more of a circuit/module for generating DCI 1220, a circuit/module for sending 1222, a circuit/module for generating information 1224, a circuit/module for receiving 1226, a circuit/module for combining 1228, or a circuit/module for coding (e.g., encoding or decoding) 1230. In various implementations, the circuit/module for generating DCI 1220, the circuit/module for sending 1222, the circuit/module for generating information 1224, the circuit/module for receiving 1226, the circuit/module for combining 1228, or the circuit/module for coding (e.g., encoding or decoding) 1230 may provide and/or incorporate, at least in part, the functionality described above for the first device 602 (e.g., the communication controller 606) of FIG. 6.

As mentioned above, programming stored by the storage medium 1204, when executed by the processing circuit 1210, causes the processing circuit 1210 to perform one or more of the various functions and/or process operations described herein. For example, the programming may cause the processing circuit 1210 to perform the various functions, steps, and/or processes described herein with respect to FIGS. 1-9 and 13 in various implementations. As shown in FIG. 12, the storage medium 1204 may include one or more of code for generating DCI 1240, code for sending 1242, code for generating information 1244, code for receiving 1246, code for combining 1248, or code for coding (e.g., encoding or decoding) 1250. In various implementations, the code for generating DCI 1240, the code for sending 1242, the code for generating information 1244, the code for receiving 1246, the code for combining 1248, or the code for coding (e.g., encoding or decoding) 1250 may be executed or otherwise used to provide the functionality described herein for the circuit/module for generating DCI 1220, the circuit/module for sending 1222, the circuit/module for generating information 1224, the circuit/module for receiving 1226, the circuit/module for combining 1228, or the circuit/module for coding (e.g., encoding or decoding) 1230.

Figure 13:
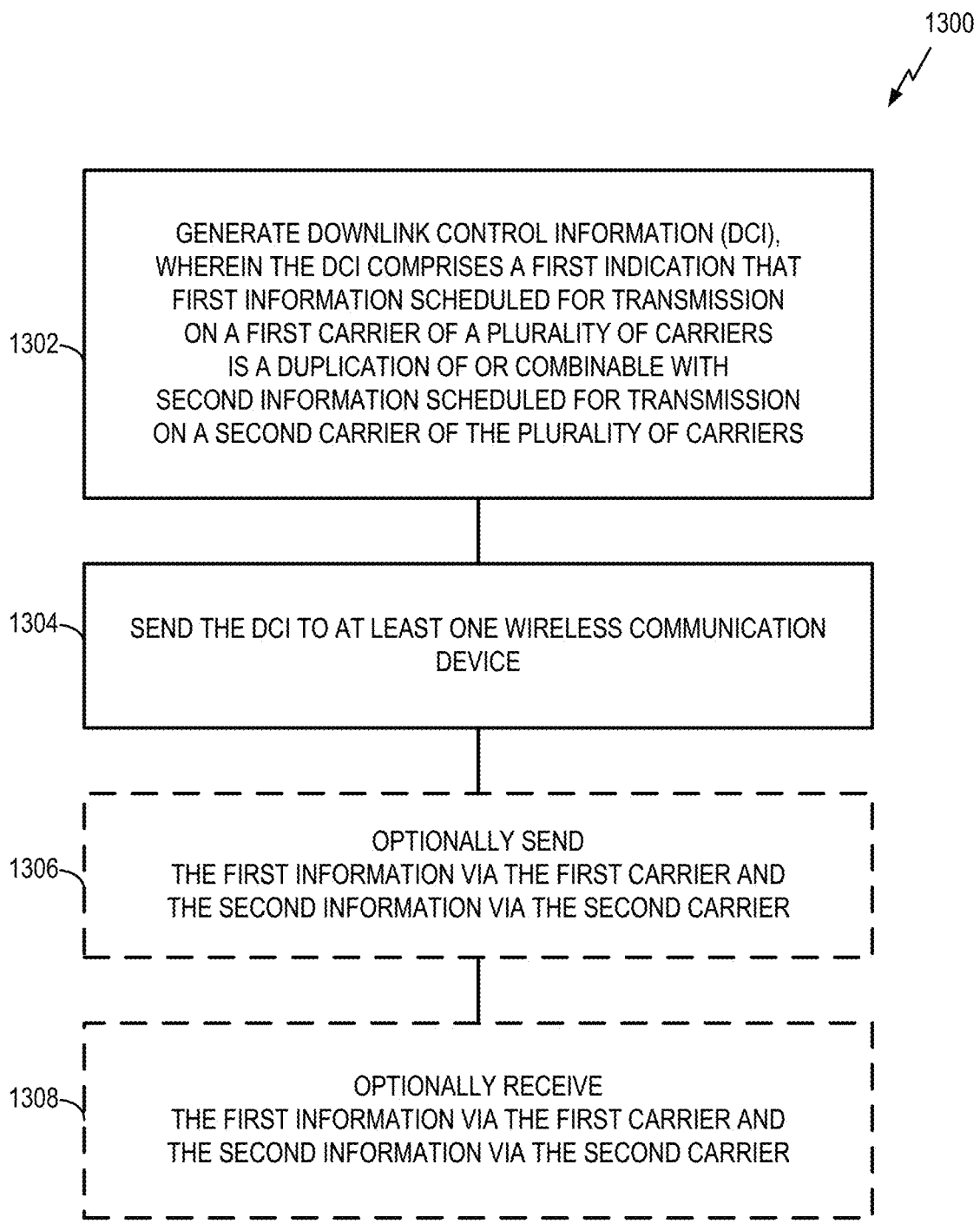
FIG. 13 is a flowchart illustrating an example of a process for communicating on multiple carriers according to a DCI in accordance with some aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in a wireless communication device, a base station, a gNB, a TRP, a BS, an eNB, a CPE, or some other suitable device. Of course, in various aspects within the scope of the disclosure, the process 1300 may be implemented by any suitable device capable of supporting communication-related operations.

At block 1302, a wireless communication device (e.g., a base station) generates downlink control information (DCI). In some aspects, the DCI may include a first indication that first information scheduled for transmission on a first carrier (e.g. a first CC) of a plurality of carriers is a duplication of or combinable with second information scheduled for transmission on a second carrier (e.g. a second CC) of the plurality of carriers. In some aspects, the first indication may indicate that cross-carrier bundling is applied across a subset of the plurality of carriers. In some aspects, the first indication may indicate that cross-carrier bundling is applied across all of the plurality of carriers. In some aspects, the DCI may schedule transmissions on a plurality of carriers.

The first information and the second information may take different forms in different examples. In some aspects, the first information and the second information may include: a physical downlink shared channel (PDSCH), a physical uplink shared channel (PUSCH), a physical uplink control channel (PUCCH), a physical random access channel (PRACH), a sounding reference signal (SRS), a channel state information reference signal (CSI-RS), or an uplink feedback signal.

At block 1304, the device sends the DCI to at least one wireless communication device (e.g., a UE).

At optional block 1306, the device may send the first information via the first carrier and send the second information via the second carrier.

At optional block 1308, the device may receive the first information via the first carrier and send the second information via the second carrier.

In some aspects, the DCI may further include a second indication that specifies a first redundancy version for the first carrier; and the second indication may further specify a second redundancy version different from the first redundancy version for the second carrier.

In some aspects, the DCI may further include a second indication that specifies a redundancy version that is mapped to a first redundancy version for the first carrier and a second redundancy version for the second carrier.

In some aspects, the DCI may further include a second indication that specifies a first beam for the first carrier and a second beam different from the first beam for the second carrier.

In some aspects, the first information and the second information may include: a physical downlink shared channel (PDSCH), a physical uplink shared channel (PUSCH), or a physical uplink control channel (PUCCH); and the DCI may further include a second indication that indicates that a demodulation reference signal (DMRS) is duplicated across the first carrier and the second carrier.

In some aspects, the first information and the second information may include: a physical downlink shared channel (PDSCH) or a physical uplink shared channel (PUSCH); and the DCI may further include a second indication that specifies a first redundancy version for the first carrier and a second redundancy version different from the first redundancy version for the second carrier. In some aspects, the DCI may further include a third indication that specifies a first beam for the first carrier and a second beam different from the first beam for the second carrier.

In some aspects, the process 1300 may further include: generating the first information according to the first indication; generating the second information according to the first indication; sending the first information via the first carrier; and sending the second information via the second carrier. In some aspects, the DCI may further include a second indication that specifies a first redundancy version for the first carrier; the second indication may further specify a second redundancy version different from the first redundancy version for the second carrier; the generation of the first information may be based on the first redundancy version according to the second indication; and the generation of the second information may be based on the second redundancy version according to the second indication. In some aspects, the DCI may further include a second indication that specifies a redundancy version that is mapped to a first redundancy version for the first carrier and a second redundancy version for the second carrier; the generation of the first information may be based on the first redundancy version according to the second indication; and the generation of the second information may be based on the second redundancy version according to the second indication.

In some aspects, the DCI may further include a second indication that specifies a first beam for the first carrier; the second indication may further specify a second beam different from the first beam for the second carrier; the first information may be sent via the first beam according to the second indication; and the second information may be sent via the second beam according to the second indication.

In some aspects, the process 1300 may further include: receiving the first information via the first carrier; receiving the second information via the second carrier; and combining the first information and the second information according to the first indication. In some aspects, the DCI may further include a second indication that specifies a first redundancy version for the first carrier; the second indication may further specify a second redundancy version different from the first redundancy version for the second carrier; and the combining may include a decoding operation based on the first redundancy version and the second redundancy version. In some aspects, the DCI may further include a second indication that specifies a redundancy version that is mapped to a first redundancy version for the first carrier and a second redundancy version for the second carrier; and the combining may include a decoding operation based on the first redundancy version for the first carrier and the second redundancy version for the second carrier.

In some aspects, the DCI may further include a second indication that specifies a first beam for the first carrier; the second indication may further specify a second beam different from the first beam for the second carrier; the first information may be received via the first beam according to the second indication; and the second information may be received via the second beam according to the second indication.

In some aspects, a process in accordance with the teachings herein may include any combination of the above operations.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1,2, and/or 4-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication at a user equipment, comprising:
    receiving downlink control information (DCI), the DCI comprising a first indication that first information scheduled for transmission on a first carrier of a plurality of carriers is a duplication of or combinable with second information scheduled for transmission on a second carrier of the plurality of carriers, the DCI further comprising a second indication indicating a first redundancy version for the first carrier, the second indication further indicating a second redundancy version different from the first redundancy version for the second carrier;
    receiving or transmitting the first information via the first carrier; and
    receiving or transmitting the second information via the second carrier.

2. A user equipment, comprising:
    one or more memories storing processor-executable code; and
    one or more processors configured to execute the processor-executable code and cause the user equipment to:
        receive, via the transceiver, downlink control information (DCI), the DCI comprising a first indication that first information scheduled for transmission on a first carrier of a plurality of carriers is a duplication of or combinable with second information scheduled for transmission on a second carrier of the plurality of carriers, the DCI further comprising a second indication indicating a first redundancy version for the first carrier, the second indication further indicating a second redundancy version different from the first redundancy version for the second carrier;
        receive or transmit the first information via the first carrier; and
        receive or transmit the second information via the second carrier.

3. The user equipment of claim 2, wherein the first indication indicates that cross-carrier bundling is applied across a subset of the plurality of carriers.

4. The user equipment of claim 2, wherein the first indication indicates that cross-carrier bundling is applied across all of the plurality of carriers.

5. The user equipment of claim 2, wherein:
    the one or more processors are further configured to execute the processor-executable code and cause the user equipment to perform a decode operation based on the first redundancy version and the second redundancy version.

6. The user equipment of claim 2, wherein:
    the second indication specifies a redundancy version that is mapped to the first redundancy version for the first carrier and the second redundancy version for the second carrier; and
    the one or more processors are further configured to execute the processor-executable code and cause the user equipment to perform a decode operation based on the first redundancy version for the first carrier and the second redundancy version for the second carrier.

7. The user equipment of claim 2, wherein the first information and the second information comprise: a physical downlink shared channel (PDSCH), a physical uplink shared channel (PUSCH), a physical uplink control channel (PUCCH), a physical random access channel (PRACH), a sounding reference signal (SRS), a channel state information reference signal (CSI-RS), or an uplink feedback signal.

8. The user equipment of claim 2, wherein:
    the DCI further comprises a third indication that specifies a first beam for the first carrier;
    the third indication further specifies a second beam different from the first beam for the second carrier;
    the one or more processors are further configured to execute the processor-executable code and cause the user equipment to receive the first information via the first beam according to the third indication; and
    the one or more processors are further configured to execute the processor-executable code and cause the user equipment to receive the second information via the second beam according to the third indication.

9. The user equipment of claim 2, wherein:
    the first information and the second information comprise: a physical downlink shared channel (PDSCH), a physical uplink shared channel (PUSCH), or a physical uplink control channel (PUCCH); and
    the DCI further comprises a third indication that indicates that a demodulation reference signal (DMRS) is duplicated across the first carrier and the second carrier.

10. The user equipment of claim 9, wherein the one or more processors are further configured to execute the processor-executable code and cause the user equipment to:
    receive a first DMRS via the first carrier according to the third indication;
    receive a second DMRS via the second carrier according to the third indication;
    combine the first DMRS and the second DMRS; and
    decode the first information and the second information based on the combination of the first DMRS and the second DMRS.

11. The user equipment of claim 2, wherein:
the first information and the second information comprise:
a physical downlink shared channel (PDSCH) or a physical uplink shared channel (PUSCH); and
the one or more processors are further configured to execute the processor-executable code and cause the user equipment to perform a decode operation based on the first redundancy version for the first information and the second redundancy version for the second information.

12. The user equipment of claim 11, wherein:
the DCI further comprises a third indication that specifies a first beam for the first carrier;
the third indication further specifies a second beam different from the first beam for the second carrier;
the one or more processors are further configured to execute the processor-executable code and cause the user equipment to receive the first information via the first beam according to the third indication; and
the one or more processors are further configured to execute the processor-executable code and cause the user equipment to receive the second information via the second beam according to the third indication.

13. The user equipment of claim 2, wherein the DCI further comprises a third indication that third information scheduled for transmission on the first carrier is a duplication of or combinable with fourth information scheduled for transmission on the second carrier, and wherein the one or more processors are further configured to execute the processor-executable code and cause the user equipment to:
generate the third information according to the third indication, generate the fourth information according to the third indication,
transmit the third information via the first carrier, and
transmit the fourth information via the second carrier.

14. The user equipment of claim 13, wherein:
the one or more processors are further configured to execute the processor-executable code and cause the user equipment to generate the third information is-based on the first redundancy version according to the second indication; and
the one or more processors are further configured to execute the processor-executable code and cause the user equipment to generate the fourth information is based on the second redundancy version according to the second indication.

15. The user equipment of claim 13, wherein:
the second indication specifies a redundancy version that is mapped to the first redundancy version for the first carrier and the second redundancy version for the second carrier;
the one or more processors are further configured to execute the processor-executable code and cause the device to generate the third information based on the first redundancy version according to the second indication; and
the one or more processors are further configured to execute the processor-executable code and cause the device to generate the fourth information based on the second redundancy version according to the second indication.

16. The user equipment of claim 13, wherein:
the DCI further comprises a fourth indication that specifies a first beam for the first carrier;
the fourth indication further specifies a second beam different from the first beam for the second carrier;

the third information is sent via the first beam according to the fourth indication; and
the one or more processors are further configured to execute the processor-executable code and cause the user equipment to transmit the fourth information via the second beam according to the fourth indication.

17. A method of communication at a network entity, comprising:
transmitting downlink control information (DCI), the DCI comprising a first indication that first information scheduled for transmission on a first carrier of a plurality of carriers is a duplication of or combinable with second information scheduled for transmission on a second carrier of the plurality of carriers, the DCI further comprising a second indication indicating a first redundancy version for the first carrier, the second indication further indicating a second redundancy version different from the first redundancy version for the second carrier;
transmitting or receiving the first information via the first carrier; and
transmitting or receiving the second information via the second carrier.

18. A network entity, comprising:
one or more memories storing processor-executable code; and
one or more processors configured to execute the processor-executable code and cause the network entity to:
transmit downlink control information (DCI), the DCI comprising a first indication that first information scheduled for transmission on a first carrier of a plurality of carriers is a duplication of or combinable with second information scheduled for transmission on a second carrier of the plurality of carriers, the DCI further comprising a second indication indicating a first redundancy version for the first carrier, the second indication further indicating a second redundancy version different from the first redundancy version for the second carrier;
transmit or receive the first information via the first carrier; and
transmit or receive the second information via the second carrier.

19. The network entity of claim 18, wherein the first indication indicates that cross-carrier bundling is applied across a subset of the plurality of carriers.

20. The network entity of claim 18, wherein the first indication indicates that cross-carrier bundling is applied across all of the plurality of carriers.

21. The network entity of claim 18, wherein the second indication specifies a redundancy version that is mapped to the first redundancy version for the first carrier and the second redundancy version for the second carrier.

22. The network entity of claim 18, wherein the first information and the second information comprise: a physical downlink shared channel (PDSCH), a physical uplink shared channel (PUSCH), a physical uplink control channel (PUCCH), a physical random access channel (PRACH), a sounding reference signal (SRS), a channel state information reference signal (CSI-RS), or an uplink feedback signal.

23. The network entity of claim 18, wherein the DCI further comprises a third indication that specifies a first beam for the first carrier and a second beam different from the first beam for the second carrier.

24. The network entity of claim 18, wherein:
the first information and the second information comprise:
a physical downlink shared channel (PDSCH), a physical uplink shared channel (PUSCH), or a physical uplink control channel (PUCCH); and the DCI further comprises a third indication that indicates that a demodulation reference signal (DMRS) is duplicated across the first carrier and the second carrier.

25. The network entity of claim 18, wherein:
the first information and the second information comprise: a physical downlink shared channel (PDSCH) or a physical uplink shared channel (PUSCH).

26. The network entity of claim 25, wherein the DCI further comprises a third indication that specifies a first beam for the first carrier and a second beam different from the first beam for the second carrier.

27. The network entity of claim 18, wherein the the one or more processors are further configured to execute the processor-executable code and cause the network entity to:
generate the first information according to the first indication;
generate the second information according to the first indication;
transmit the first information via the first carrier; and
transmit the second information via the second carrier.

28. The network entity of claim 27, wherein:
the one or more processors are further configured to execute the processor-executable code and cause the network entity to generate the first information based on the first redundancy version according to the second indication; and
the one or more processors are further configured to execute the processor-executable code and cause the network entity to generate the second information is based on the second redundancy version according to the second indication.

29. The network entity of claim 27, wherein:
the second indication specifies a redundancy version that is mapped to the first redundancy version for the first carrier and the second redundancy version for the second carrier; and
the one or more processors are further configured to execute the processor-executable code and cause the network entity to generate the first information is-based on the first redundancy version according to the second indication; and
the one or more processors are further configured to execute the processor-executable code and cause the network entity to generate the second information based on the second redundancy version according to the second indication.

30. The network entity of claim 27, wherein:
the DCI further comprises a third indication that specifies a first beam for the first carrier;
the third indication further specifies a second beam different from the first beam for the second carrier;
the one or more processors are further configured to execute the processor-executable code and cause the network entity to transmit the first information via the first beam according to the third indication; and
the one or more processors are further configured to execute the processor-executable code and cause the network entity to transmit the second information via the second beam according to the third indication.

31. The network entity of claim 18, wherein the the one or more processors are further configured to execute the processor-executable code and cause the network entity to:
receive the first information via the first carrier;
receive the second information via the second carrier; and
combine the first information and the second information according to the first indication.

32. The network entity of claim 31, wherein:
the one or more processors are further configured to execute the processor-executable code and cause the network entity to perform a decoding operation based on the first redundancy version and the second redundancy version.

33. The network entity of claim 31, wherein:
the second indication specifies a redundancy version that is mapped to the first redundancy version for the first carrier and the second redundancy version for the second carrier; and
the one or more processors are further configured to execute the processor-executable code and cause the network entity to perform a decoding operation based on the first redundancy version for the first carrier and the second redundancy version for the second carrier.

34. The network entity of claim 31, wherein:
the DCI further comprises a third indication that specifies a first beam for the first carrier;
the third indication specifies a second beam different from the first beam for the second carrier;
the one or more processors are further configured to execute the processor-executable code and cause the network entity to receive the first information via the first beam according to the third indication; and
the one or more processors are further configured to execute the processor-executable code and cause the network entity to receive the second information via the second beam according to the third indication.

* * * * *